US012711250B2

(12) United States Patent
Fukuda et al.

(10) Patent No.: US 12,711,250 B2
(45) Date of Patent: Aug. 18, 2026

(54) INFORMATION PROCESSING SYSTEM, INFORMATION PROCESSING APPARATUS, METHOD OF CONTROLLING THE SAME, AND STORAGE MEDIUM

(71) Applicant: Canon Kabushiki Kaisha, Tokyo (JP)

(72) Inventors: Masato Fukuda, Chiba (JP); Takashi Osuki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 139 days.

(21) Appl. No.: 18/152,220

(22) Filed: Jan. 10, 2023

(65) Prior Publication Data

US 2023/0267218 A1 Aug. 24, 2023

(30) Foreign Application Priority Data

Feb. 21, 2022 (JP) ................................ 2022-024920
Feb. 21, 2022 (JP) ................................ 2022-024921
Oct. 25, 2022 (JP) ................................ 2022-170871

(51) Int. Cl.
*G06F 21/60* (2013.01)
*G06F 21/62* (2013.01)
*H04N 1/00* (2006.01)

(52) U.S. Cl.
CPC ........ *G06F 21/604* (2013.01); *G06F 21/6227* (2013.01); *H04N 1/00488* (2013.01)

(58) Field of Classification Search
CPC .............. G06F 21/604; G06F 21/6227; H04N 1/00488
See application file for complete search history.

(56) References Cited

U.S. PATENT DOCUMENTS 9,147,054 B1 * 9/2015 Beal ........................ G06F 21/32
10,754,714 B1 * 8/2020 Adams .................... G06F 21/84
2008/0026723 A1 * 1/2008 Han .................. H04M 1/72448 455/410

(Continued)

FOREIGN PATENT DOCUMENTS

CN 109558106 A 4/2019
CN 113890958 A 1/2022

(Continued)

OTHER PUBLICATIONS

Extended European Search Report issued on Jul. 3, 2023 in counterpart European Patent Appln. No. 22216904.7.

(Continued)

*Primary Examiner* — Kevin Bechtel
*Assistant Examiner* — Forrest L Carey
(74) *Attorney, Agent, or Firm* — Venable LLP

(57) ABSTRACT

An information processing system in which an information processing apparatus and a voice control apparatus can communicate via a network is provided. The information processing apparatus holds a security level of the voice control apparatus, obtains, when an occurrence of a predetermined event is detected, information relating to a message associated with the predetermined event, and determines a message to be transmitted to the voice control apparatus based on the security level of the voice control apparatus and information relating to the message. The voice control apparatus reproduces the message, which has been transmitted from the information processing apparatus.

10 Claims, 17 Drawing Sheets

(56) References Cited

U.S. PATENT DOCUMENTS

| | | | | |
|---|---|---|---|---|
| 2019/0274003 | A1* | 9/2019 | Annamalai | H04W 4/029 |
| 2021/0075772 | A1* | 3/2021 | Tew | H04L 63/0428 |
| 2021/0266731 | A1* | 8/2021 | Omsberg | H04W 12/65 |
| 2021/0398530 | A1 | 12/2021 | Kasahara | |
| 2023/0059611 | A1* | 2/2023 | Isozaki | G10L 15/02 |
| 2024/0004982 | A1* | 1/2024 | Fang | G06F 21/32 |

FOREIGN PATENT DOCUMENTS

| | | | |
|---|---|---|---|
| JP | 2001-265370 | A | 9/2001 |
| JP | 2015-063879 | A | 5/2015 |
| JP | 2019-184800 | A | 10/2019 |
| JP | 2020-177131 | A | 10/2020 |

OTHER PUBLICATIONS

European Office Action dated Nov. 28, 2025 in counterpart European Patent Appln. No. 22216904.7.

Chinese Office Action dated May 26, 2026 in counterpart Chinese Patent Appln. No. 202310104741.3, with English translation.

* cited by examiner

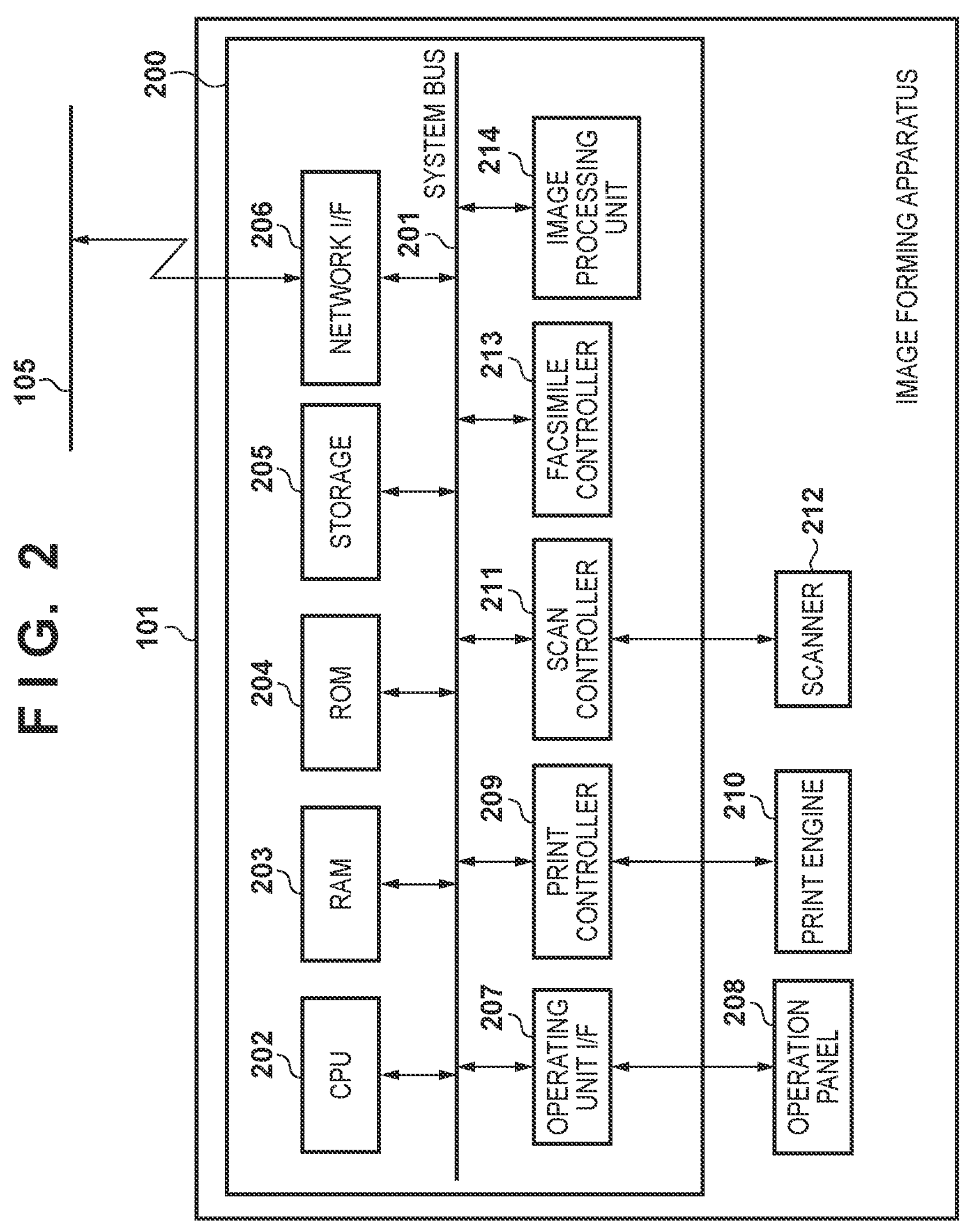
F I G. 2
105
200
101
IMAGE FORMING APPARATUS
SYSTEM BUS
201
202
CPU
203
RAM
204
ROM
205
STORAGE
206
NETWORK I/F
207
OPERATING UNIT I/F
208
OPERATION PANEL
209
PRINT CONTROLLER
210
PRINT ENGINE
211
SCAN CONTROLLER
212
SCANNER
213
FACSIMILE CONTROLLER
214
IMAGE PROCESSING UNIT

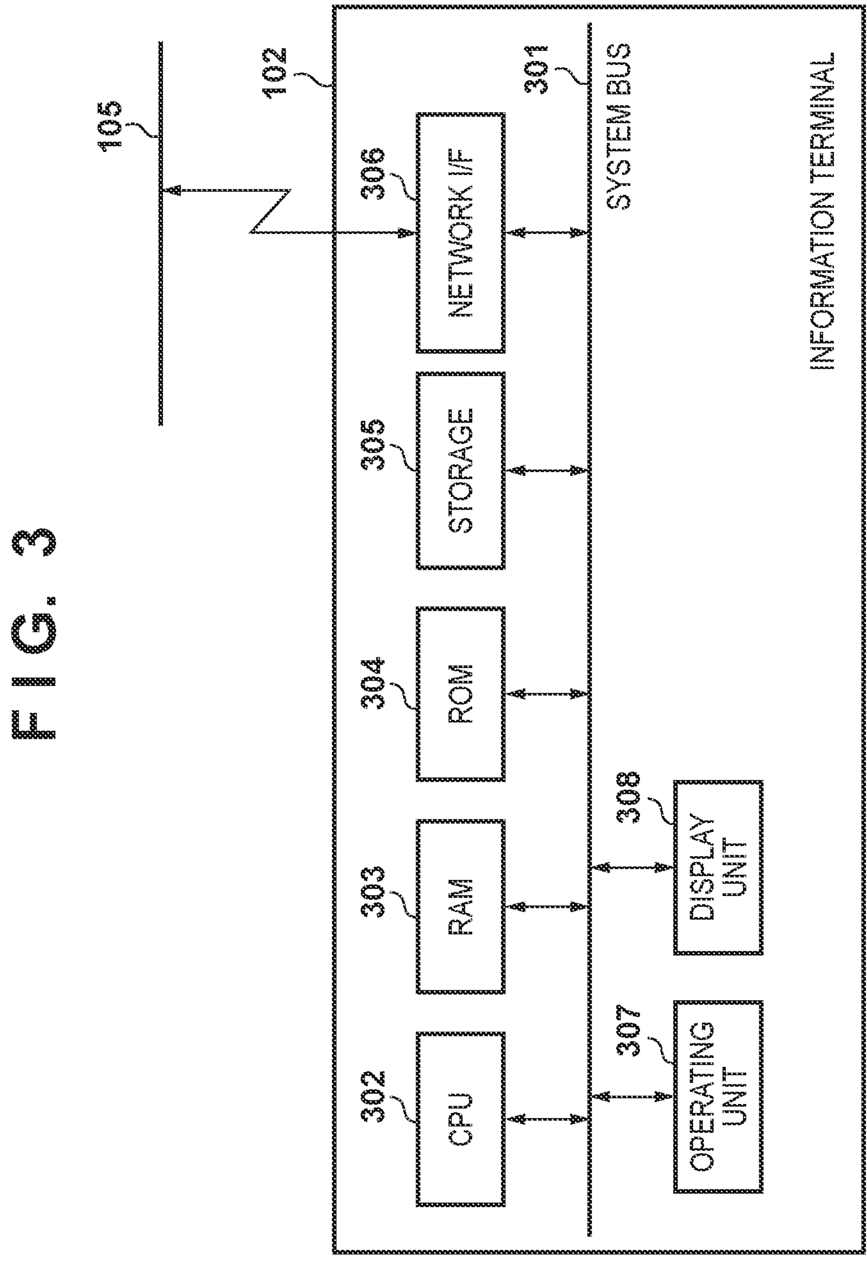
F I G. 3
105
102
301
SYSTEM BUS
INFORMATION TERMINAL
306
NETWORK I/F
305
STORAGE
304
ROM
303
RAM
302
CPU
308
DISPLAY UNIT
307
OPERATING UNIT

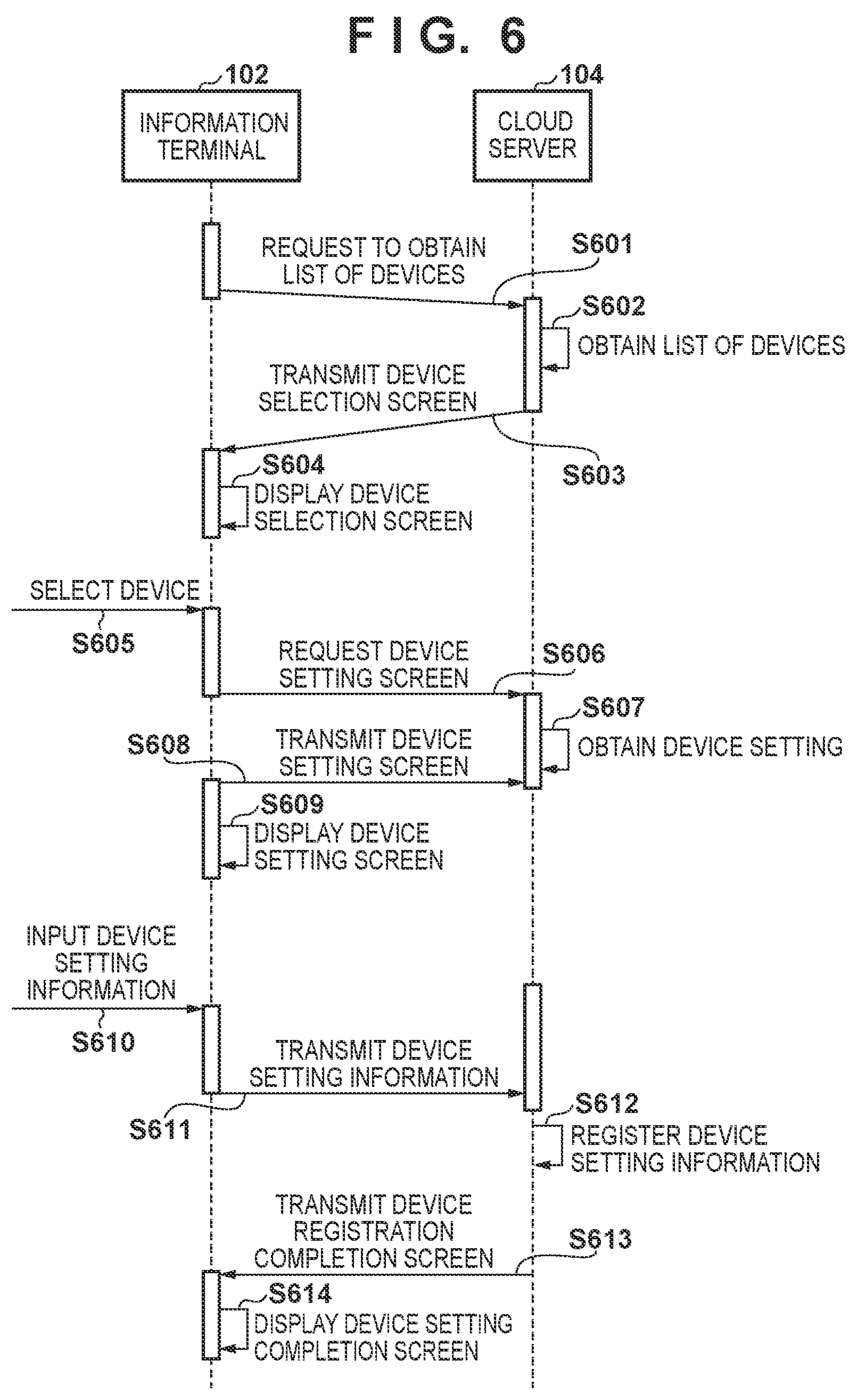
F I G. 6
102
INFORMATION TERMINAL
104
CLOUD SERVER
REQUEST TO OBTAIN LIST OF DEVICES
S601
S602
OBTAIN LIST OF DEVICES
TRANSMIT DEVICE SELECTION SCREEN
S603
S604
DISPLAY DEVICE SELECTION SCREEN
SELECT DEVICE
S605
REQUEST DEVICE SETTING SCREEN
S606
S607
OBTAIN DEVICE SETTING
S608
TRANSMIT DEVICE SETTING SCREEN
S609
DISPLAY DEVICE SETTING SCREEN
INPUT DEVICE SETTING INFORMATION
S610
TRANSMIT DEVICE SETTING INFORMATION
S611
S612
REGISTER DEVICE SETTING INFORMATION
TRANSMIT DEVICE REGISTRATION COMPLETION SCREEN
S613
S614
DISPLAY DEVICE SETTING COMPLETION SCREEN

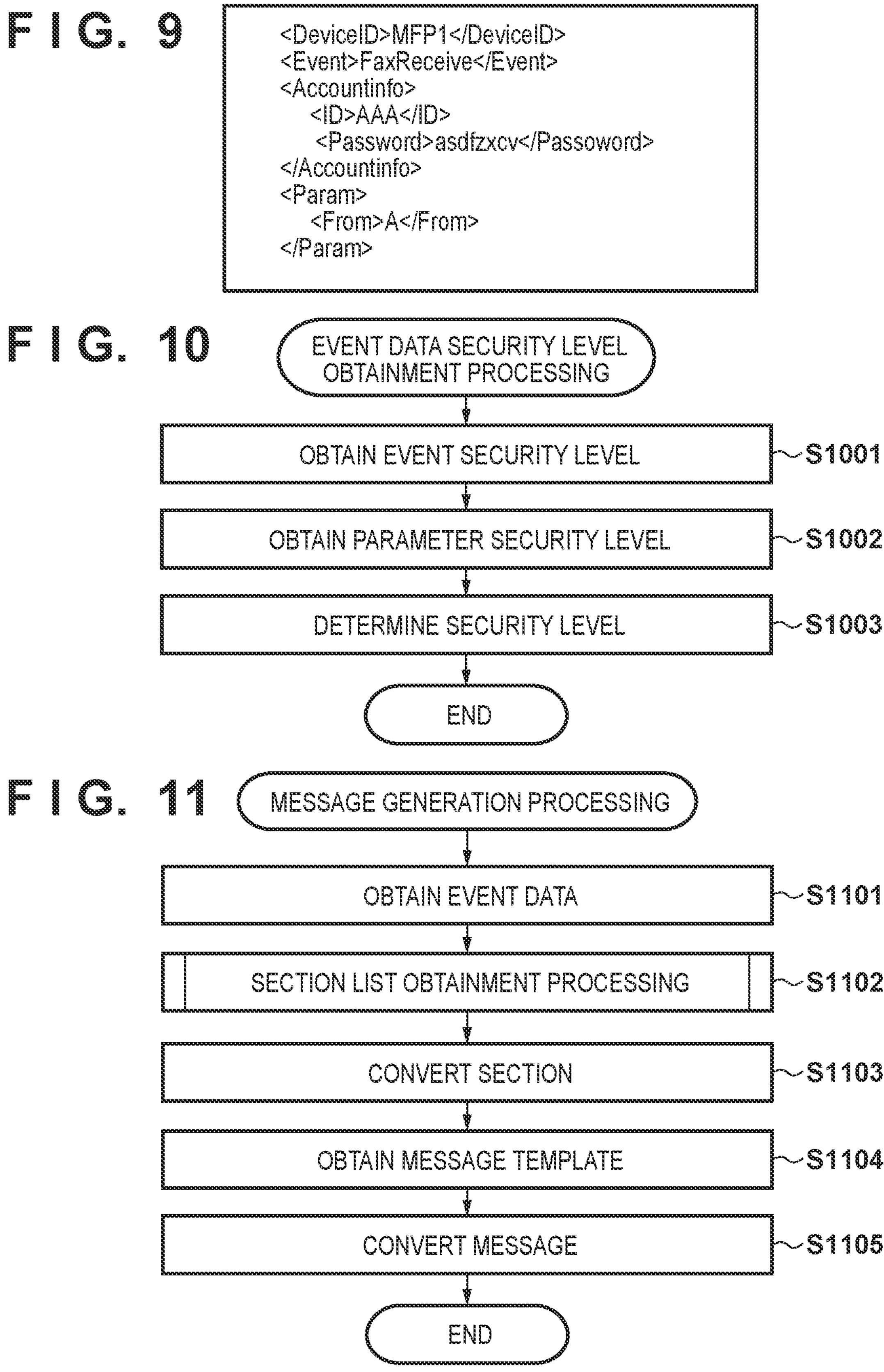
FIG. 9
<DeviceID>MFP1</DeviceID>
<Event>FaxReceive</Event>
<Accountinfo>
<ID>AAA</ID>
<Password>asdfzxcv</Passoword>
</Accountinfo>
<Param>
<From>A</From>
</Param>
FIG. 10
EVENT DATA SECURITY LEVEL OBTAINMENT PROCESSING
OBTAIN EVENT SECURITY LEVEL
S1001
OBTAIN PARAMETER SECURITY LEVEL
S1002
DETERMINE SECURITY LEVEL
S1003
END
FIG. 11
MESSAGE GENERATION PROCESSING
OBTAIN EVENT DATA
S1101
SECTION LIST OBTAINMENT PROCESSING
S1102
CONVERT SECTION
S1103
OBTAIN MESSAGE TEMPLATE
S1104
CONVERT MESSAGE
S1105
END F I G. 12
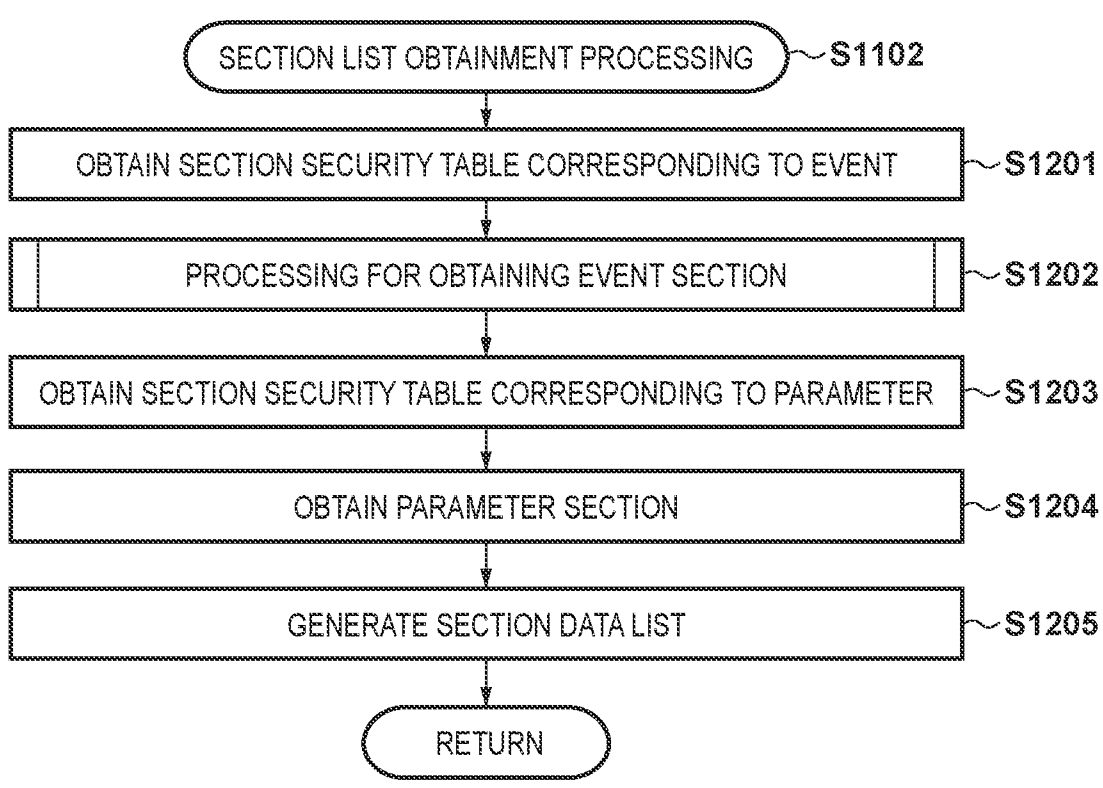
F I G. 13A
| EVENT | SECTION | SECURITY LEVEL |
| --- | --- | --- |
| FaxRecieve | RECEIVE FAX | 2 |
| EmailReceive | RECEIVE EMAIL | 2 |
| DeviceAlarm | HAS OCCURRED | 3 |
| ScanStart | SCAN HAS BEEN EXECUTED | 2 |
| PrintEnd | PRINT HAS COMPLETED | 2 |
| FaxSend | FAX HAS BEEN TRANSMITTED | 2 |
| VoiceMail | THERE IS INCOMING CALL | 2 |
| MeetingAnnounce | MEETING BEGINS | 1 |

FIG. 13B

| ATTRIBUTE | SECTION | SECURITY LEVEL |
|---|---|---|
| Address | TO $Addree$ | 1 |
| Cause | $Cause$ | 2 |
| Cause | EVENT | 3 |
| DeviceName | TO $DeviceName$ | 2 |
| EmailAddress | FROM $Email$ | 1 |
| FaxNum | FROM $FaxNum$ | 1 |
| FileName | TO $FileName$ | 1 |
| FileName | OF FILE | 2 |
| From | FROM Mr. $From$ | 1 |
| Tell | FROM $Tell$ | 1 |
| Time | AT $Time$ | 2 |
| Title | OF TITLE $TITLE$ | 1 |
| To | TO $To$ | 1 |

FIG. 14

| TENANT ID | DEVICE ID | SECURITY LEVEL |
|---|---|---|
| AAA | SMART SPEAKER A | 1 |
| AAA | SMART SPEAKER B | 2 |
| AAA | SMART SPEAKER C | 3 |
| BBB | LAPTOP 1 | 1 |

| ADDRESS | FAX NUMBER |
|---|---|
| A | 1111 |
| B | 2222 |
| C | 3333 |

○○MONTH ×× DAY

OUTSOURCING REQUEST
TO CORPORATION ■■

WE WILL PLACE AN ORDER AS FOLLOWS

| PRODUCT NAME | QUANTITY | UNIT PRICE | MONEY AMOUNT |
|---|---|---|---|
| ××× | 10 | 500 | 5,000 |

TOTAL MONEY AMOUNT 5,500 YEN
(CONSUMER TAX: 500 YEN)

▲▼ COMMERCIAL SALES REPRESENTATIVE A
TEL xxx-xxxx-xxxx

FIG. 19A

| AREA CLASSIFICATION | CLASSIFICATION CONDITION |
|---|---|
| DEPARTMENT AREA | CONNECTED TO ROUTER 2100 OR 2101 AND SUBNETS 192.168.100.0/24, 192.168.110.0/24 |
| IN-HOUSE AREA | NOT CONNECTED TO ROUTER 2100 OR 2101 AND SUBNETS 192.168.100.0/24, 192.168.110.0/24 |
| OUTSIDE THE COMPANY AREA | NOT DEPARTMENT AREA OR IN-HOUSE AREA |

FIG. 19B

| CONNECTED DEVICE | CONNECTED ROUTER | SUBNET |
|---|---|---|
| SMART SPEAKER A | ROUTER 2100 | 192.168.100.0/24 |
| SMART SPEAKER B | ROUTER 2101 | 192.168.110.0/24 |
| SMART SPEAKER C | Unknown | 192.168.190.0/24 |

FIG. 19C

| AREA CLASSIFICATION | AREA SECURITY LEVEL |
|---|---|
| DEPARTMENT AREA | 1 |
| IN-HOUSE AREA | 2 |
| OUTSIDE THE COMPANY AREA | 3 |

FIG. 19D

| AREA CLASSIFICATION | INSTALLATION LOCATION |
|---|---|
| DEPARTMENT AREA | 401 |
| OUTSIDE THE COMPANY AREA | 402,403,301,302,303 |
| IN-HOUSE AREA | 401,402,403,301,302,303 |

F I G. 20
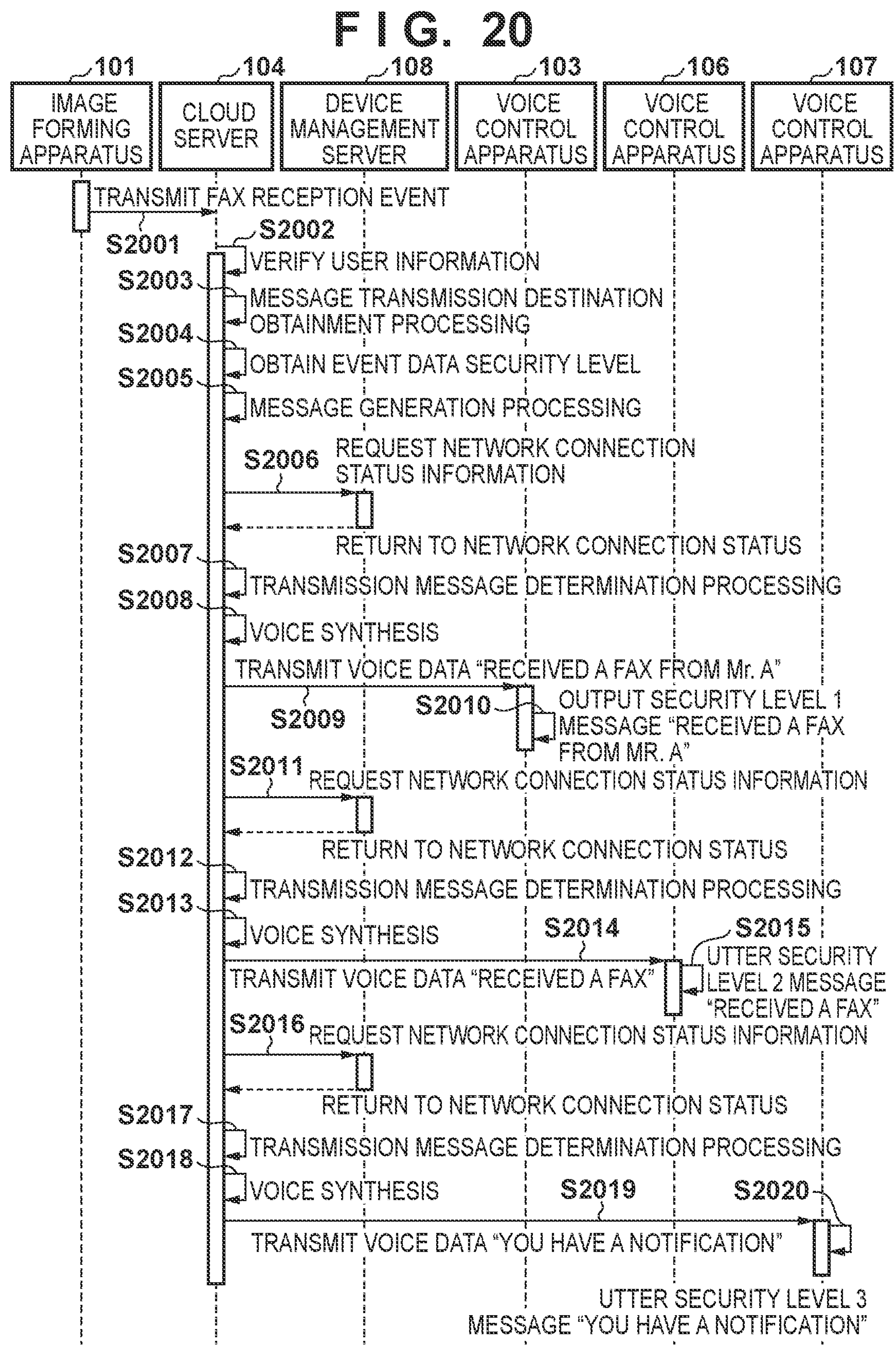

F I G. 21
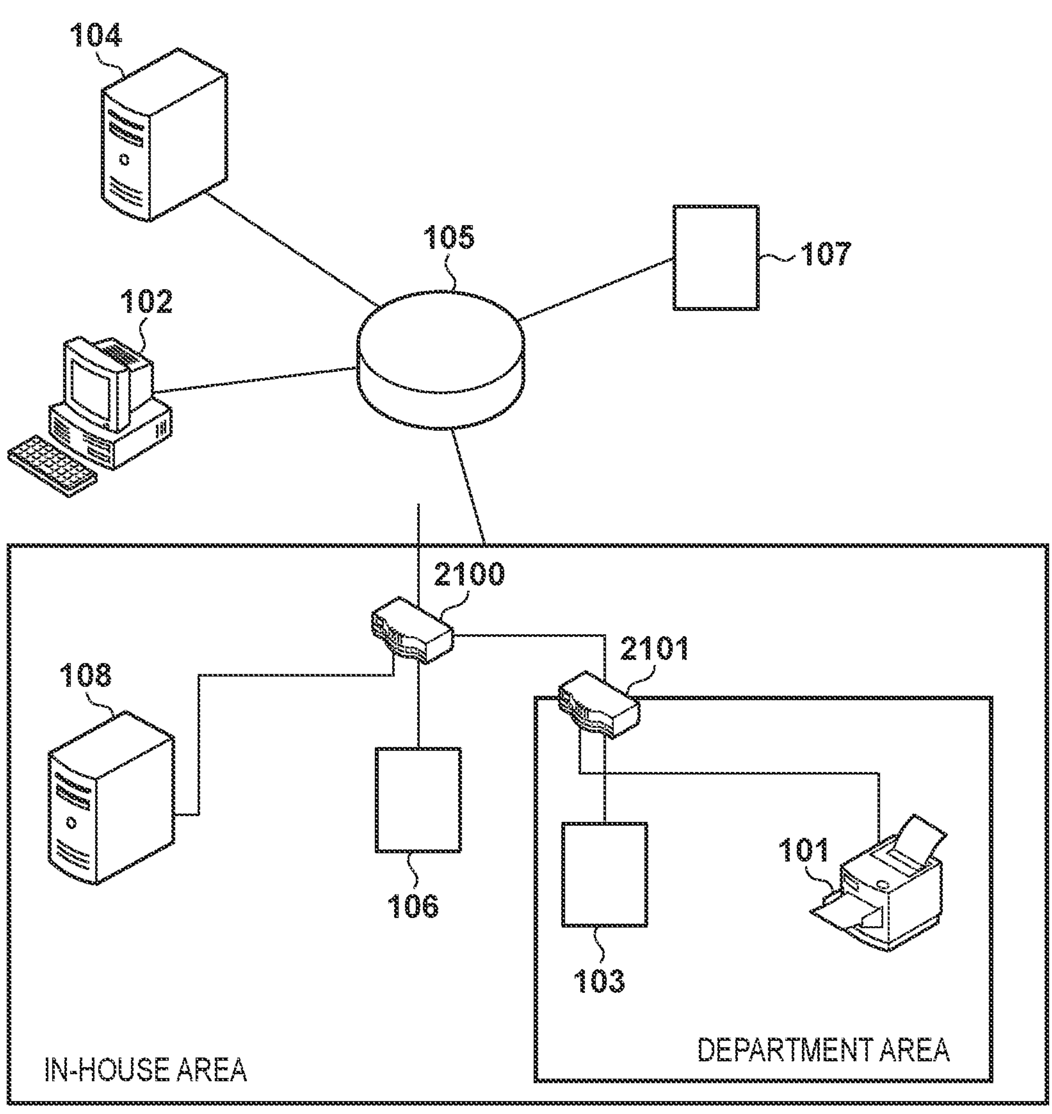

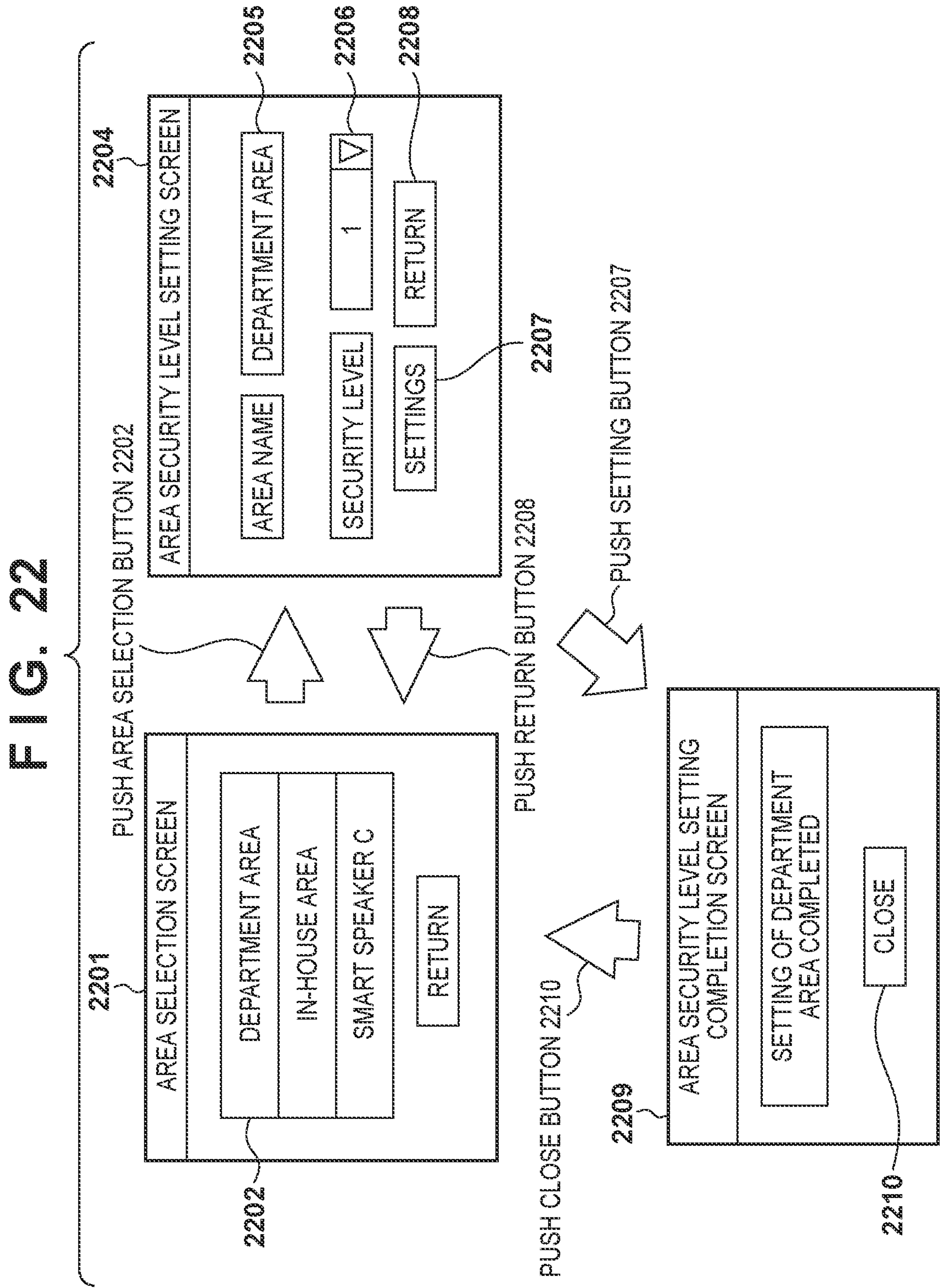
F I G. 22
2201
AREA SELECTION SCREEN
DEPARTMENT AREA
IN-HOUSE AREA
SMART SPEAKER C
RETURN
2202
PUSH AREA SELECTION BUTTON 2202
PUSH RETURN BUTTON 2208
2204
AREA SECURITY LEVEL SETTING SCREEN
2205
AREA NAME
DEPARTMENT AREA
2206
SECURITY LEVEL
1
2208
SETTINGS
RETURN
2207
PUSH SETTING BUTTON 2207
PUSH CLOSE BUTTON 2210
2209
AREA SECURITY LEVEL SETTING COMPLETION SCREEN
SETTING OF DEPARTMENT AREA COMPLETED
CLOSE
2210

INFORMATION PROCESSING SYSTEM, INFORMATION PROCESSING APPARATUS, METHOD OF CONTROLLING THE SAME, AND STORAGE MEDIUM

BACKGROUND OF THE INVENTION

Field of the Invention

The present invention relates to an information processing system, an information processing apparatus, a method of controlling the same, and a storage medium.

Description of the Related Art

There are systems that enable a service on a network to notify a voice control apparatus of a message, and the voice control apparatus to notify a user of the message by voice. Generally, communication by voice, when compared to character-based chatting and the like, is more convenient, in that it is easy to receive and transmit information, and a large number of people can share and discuss information instantaneously. However, such utterances may be heard by a third party, and for example, the security risk is higher than that of in-house utterances.

Japanese Patent Laid-Open No. 2019-184800 describes a technique in which voice information inputted from each of a plurality of terminal apparatuses is obtained, and in a case where an utterance corresponding to a predetermined warning condition is detected in the voice information, countermeasure processing applicable to the detected utterance is performed so as to avoid an output of an utterance corresponding to the predetermined warning condition.

In the above-described conventional technique, a warning is displayed on a terminal apparatus of an utterer or a viewer, volume of the voice of the utterer is reduced, or utterances of the utterer are prohibited as countermeasure processing applicable to an utterance corresponding to the detected warning condition. However, there is a possibility that the utterer or the viewer cannot be prompted to confirm the content of the warning.

Also, in a case of notifying messages by voice, it is not appropriate to read out loud all messages depending on a location where a speaker is used. For example, in a location where third parties enter and exit, such as a sales department area, there is a risk of information being leaked to a third party when a message including customer information is uttered and the like.

SUMMARY OF THE INVENTION

An aspect of the present disclosure is to eliminate the above-mentioned problem with conventional technology.

A feature of the present disclosure is to provide a technique that can decrease a risk of information leakage due to voice audio output of a message and prompt a user for confirmation in response to an event.

According to a first aspect of the present invention, there is provided an information processing system in which an information processing apparatus and a voice control apparatus can communicate via a network, the information processing system comprising: the information processing apparatus comprising: one or more first controllers including one or more first processors and one or more first memories, the one or more first controllers being configured to: hold a security level of the voice control apparatus; obtain, when an occurrence of a predetermined event is detected, information relating to a message associated with the predetermined event; and determine a message to be transmitted to the voice control apparatus based on the security level of the voice control apparatus and information relating to the message; and the voice control apparatus comprising: one or more second controllers including one or more second processors and one or more second memories, the one or more second controllers being configured to: reproduce the message, which has been transmitted from the information processing apparatus.

According to a second aspect of the present invention, there is provided an information processing apparatus that, in response to an occurrence of an event, causes a cooperating voice control apparatus to output voice audio corresponding to the event, the information processing apparatus comprising: one or more controllers including one or more processors and one or first memories, the one or more controllers being configured to: obtain, when an occurrence of a predetermined event is detected, information relating to a message associated with the predetermined event; hold a security level of the voice control apparatus; determine a message to be transmitted to the voice control apparatus based on the security level and information relating to the message; and transmit the determined message to the voice control apparatus to output as voice audio.

According to a third aspect of the present invention, there is provided a method of controlling an information processing apparatus that, in response to an occurrence of an event, causes a cooperating voice control apparatus to output voice audio corresponding to the event, the control method comprising: obtaining, when an occurrence of a predetermined event is detected, information relating to a message associated with the predetermined event; and determining a message to be transmitted to the voice control apparatus based on a security level of the voice control apparatus and information relating to the message; and transmitting the determined message to the voice control apparatus to output as voice audio.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram for describing a schematic configuration of an image forming apparatus according to the first embodiment of the present invention.

FIG. 3 is a block diagram for describing a hardware configuration of an information terminal according to the first embodiment.

FIG. 6 is a sequence diagram for describing one example of setting processing of the voice control apparatus according to the first embodiment.

FIG. 9 depicts a view illustrating one example of a message of a FAX reception event.

FIG. 10 is a flowchart for describing processing for obtaining an event data security level executed by the cloud server according to the first embodiment in step S804 of FIG. 8.

FIG. 11 is a flowchart for describing message generation processing executed by the cloud server according to the first embodiment.

FIG. 12 is a flowchart for describing processing, which the cloud server executes, for obtaining a section data list of step S1102 of FIG. 11 according to the first embodiment.

FIG. 13A depicts a view illustrating one example of an event section table including sections and security levels corresponding to events.

FIG. 13B depicts a view illustrating one example of a parameter section table including sections and security levels corresponding to attributes.

FIG. 14 depicts a view illustrating one example of a setting table of the voice control apparatus according to the first embodiment.

FIG. 19A depicts a view illustrating classifications of areas and conditions of the classifications according to a second embodiment.

FIG. 19B depicts a view illustrating a network connection status of the voice control apparatus according to the second embodiment.

FIG. 19C depicts a view illustrating an example of an area security level of each area.

FIG. 19D depicts a view illustrating a relationship between an installation location and an area classification.

FIG. 20 is a sequence diagram for describing a flow of processing when notifying a FAX reception message according to the second embodiment.

FIG. 21 depicts a view illustrating one example of a configuration of an information processing system according to the second embodiment.

FIG. 22 depicts a view illustrating an example of screen transition of screens for setting a security level for each area displayed on an information terminal according to the second embodiment.

DESCRIPTION OF THE EMBODIMENTS

Embodiments of the present invention is described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Description of Terms

Non-generic terms used in the present embodiment are defined here.

An event security level means a security level with event information (data) received by a cloud server. A lower number is expressed as a higher level and indicates information that is more highly confidential.

A message security level is a security level of a message (text) that is to be generated or has been generated in the cloud server. A lower number is expressed as a higher level and indicates a message that is highly confidential.

A device security level is expressed as a lower number to indicate a higher security level, and a high device security level indicates that a device is able to handle highly confidential information.

An area security level is expressed as a lower number to indicate a higher level and a high area security level indicates that highly confidential information can be handled in the area. The security level in the later described FIGS. 13A and 13B is expressed as a lower number to indicate a higher level, and a high security level indicates high confidentiality. The security level in FIG. 14 is synonymous with the device security level.

First Embodiment

Figure 1:
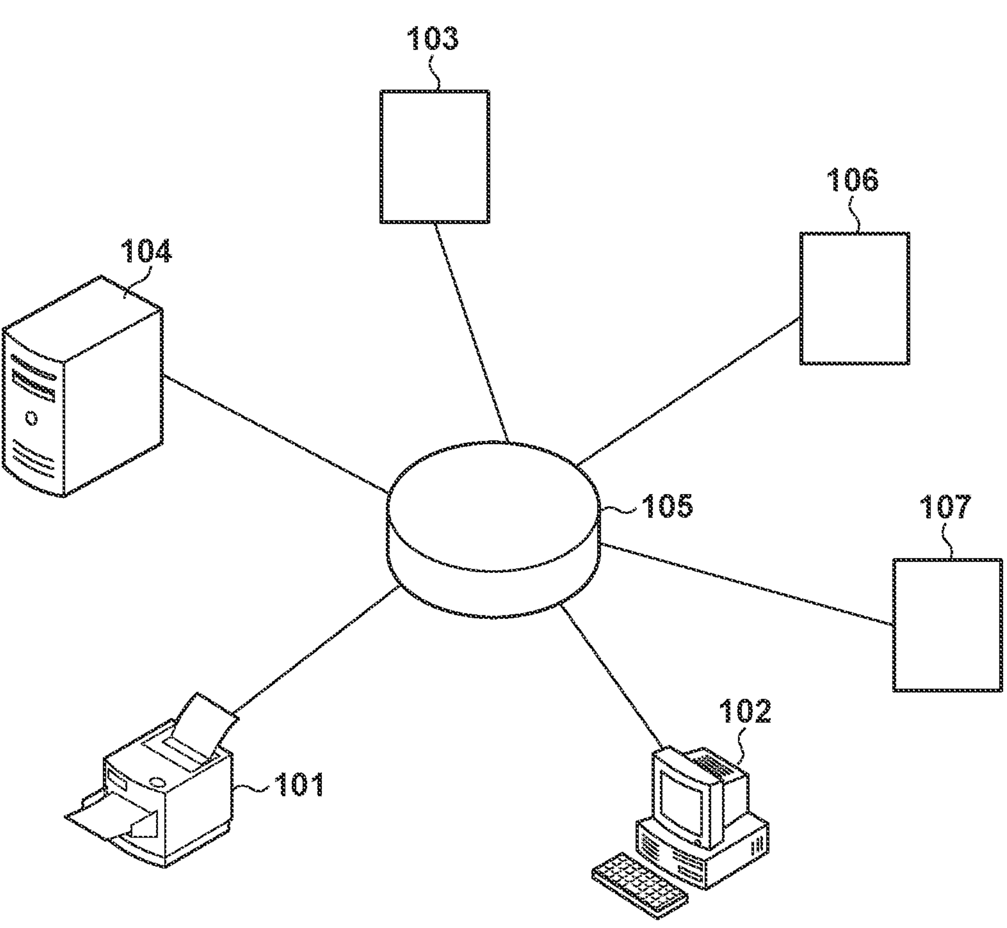
FIG. 1 depicts a view illustrating a configuration of an information processing system according to a first embodiment of the present invention.

FIG. 1 depicts a view illustrating a configuration of an information processing system according to a first embodiment of the present invention.

The information processing system includes an image forming apparatus 101, which is an Internet of Things (IoT) device that cooperates with a cloud service, and voice control apparatuses 103, 106, and 107 which may be smart phones or smart speakers that can output a message by voice (audio) based on inputted utterance data, for example. A device ID "MFP1" is made to be stored in a storage 205 (FIG. 2) of the image forming apparatus 101. In addition, a device ID "Smart Speaker A" is stored in a storage 405 (FIG. 4) of the voice control apparatus 103. Also, a device ID "Smart Speaker B" is stored in a storage of the voice control apparatus 106. Further, an information terminal 102 and a cloud server 104 operated by a user are connected via a network 105. Configuration may be taken such that the image forming apparatus 101 and the information terminal 102 are connected with a plurality of connections rather than a single connection, and regarding the voice control apparatuses 103, 106, and 107, configuration may be taken such that two or less or four or more voice control apparatuses are connected. Although a case where the voice control apparatuses 103, 106, and 107 are smart speakers is described here, the device ID in a case of a smart phone, for example, may be "Smart Phone A", an IP address, a telephone number, or the like.

The image forming apparatus 101 is a multi-function peripheral having a plurality of functions such as copy, scan, print, and FAX. The image forming apparatus 101 may be an apparatus having a single function such as a printer or a scanner.

The information terminal 102 is, for example, a personal computer (PC) used by a user. The information terminal 102 has a function for registering and changing service information of the cloud server 104 via the network 105, and a function for referring to an image file stored in the cloud server 104.

Figure 4:
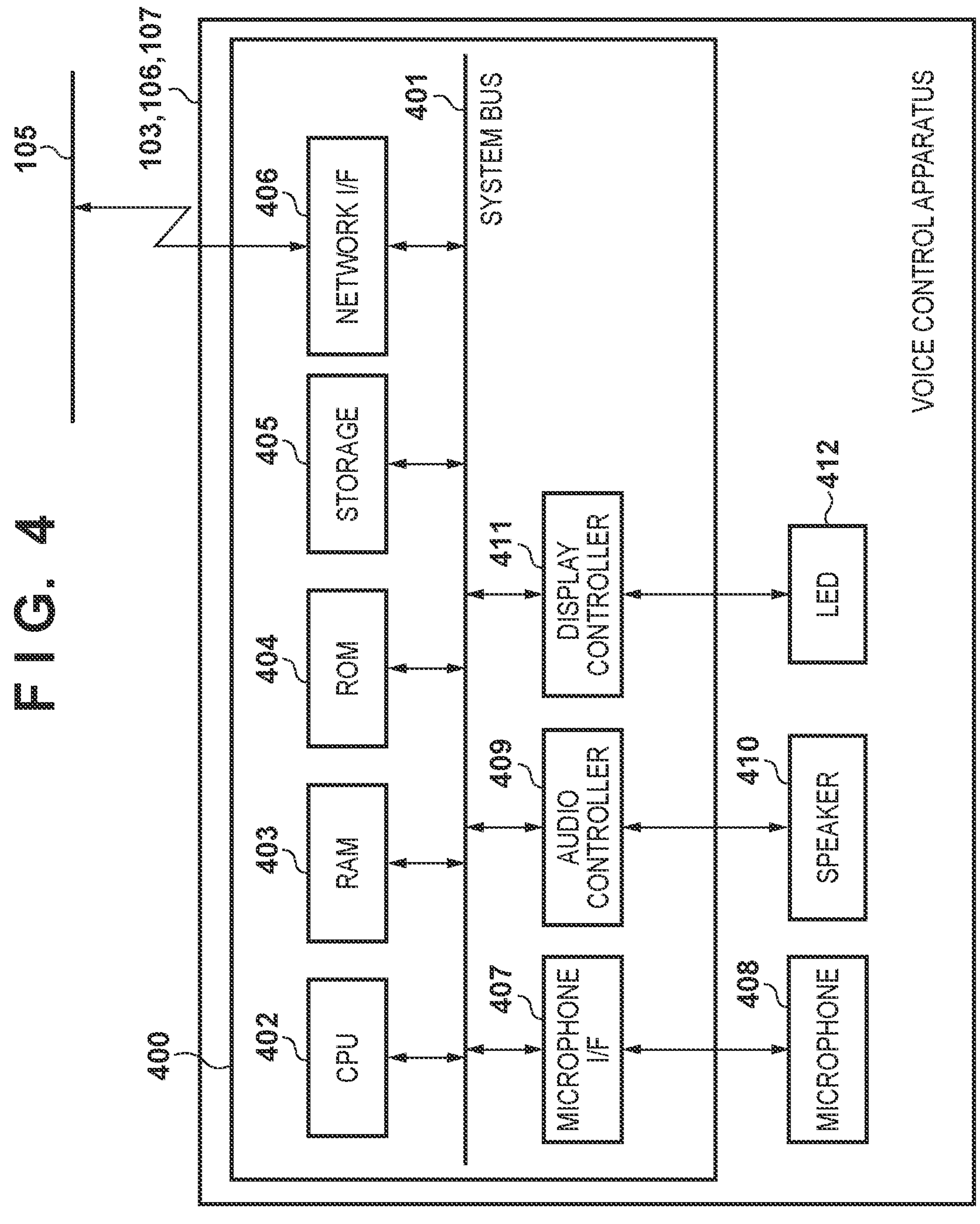
FIG. 4 is a block diagram for describing a hardware configuration example of a voice control apparatus according to the first embodiment.

The voice control apparatuses 103, 106, and 107 can synthesize utterance data received from the cloud server 104 via the network 105 into voice data that can be output as voice audio, and output the voice data from a speaker 410 (FIG. 4). In addition, according to a voice operation start instruction by the user that is inputted from a microphone 408 (FIG. 4), the user's voice can be recorded and then transmitted as encoded voice data to the cloud server 104 via the network 105.

The cloud server 104 is configured by one or more servers, and can manage a service that performs file management of electronic files including image data, a service that notifies a voice control apparatus of voice messages, and user information for accessing the electronic files.

A device management server 108 is configured by one or more servers, and has a function of managing various setting values of the voice control apparatuses 103, 106, and 107, a network connection environment, installation location information, installation position information, and the like, and returning the managed information in accordance with a request from the cloud server 104.

In the first embodiment, IoT devices that cooperate with the cloud service are the image forming apparatus 101 and the voice control apparatuses 103, 106, and 107, and a device ID "MFP1" is assumed to be stored in the storage 205 (FIG. 2) of the image forming apparatus 101. In addition, a device ID "Smart Speaker A" is stored in a storage 405 (FIG. 4) of the voice control apparatus 103. Also, a device ID "Smart Speaker B" is stored in a storage 405 of the voice control apparatus 106. Also, the user has registered in advance an ID "AAA" and a password "asdfzxcv" for using the service provided by the cloud server 104. Then, the user performs "a cloud service cooperation setting", which is a setting for having an IoT device and the cloud service cooperate, on a Web browser of the information terminal 102. At this time, the user stores the device ID "MFP1" and an IP address "192.168.100.1" of the image forming apparatus 101 and the device IDs and IP addresses of the voice control apparatuses 103, 106, and 107, which are IoT devices with which to cooperate, into a storage 505 (FIG. 5) of the cloud server 104. Here, the device ID "Smart Speaker A" and IP address "192.168.100.2" of the voice control apparatus 103, the device ID "Smart Speaker B" and IP address "192.168.100.3" of the voice control apparatus 106, and the device ID "Smart Speaker C" and IP address "192.168.100.4" of the voice control apparatus 107 are stored. Although a case where the voice control apparatuses 103, 106, and 107 are smart speakers is described here, a device ID in the case of a smart phone, for example, may be "Smart Phone A", a telephone number, or the like. Also, it is assumed that the ID "AAA", the password "asdfzxcv", and a service URL "http://service1.com" which is a Uniform Resource Locator (URL) for accessing the service provided by the cloud server 104 are stored in the storage 205 (FIG. 2) of the image forming apparatus 101 and respective storages of the voice control apparatuses 103, 106, and 107.

FIG. 2 is a block diagram for describing a schematic configuration of the image forming apparatus 101 according to the first embodiment of the present invention.

The image forming apparatus 101 includes a Central Processing Unit (CPU) 202, a RAM 203, a ROM 204, the storage 205, a network I/F 206, an operation panel I/F 207, and a print controller 209 connected to a system bus 201. Further, a scan controller 211, a facsimile controller 213, and an image processing unit 214 are connected to the system bus 201.

The CPU 202 controls the overall operation of the image forming apparatus 101. The CPU 202 performs various controls such as reading control and print control by deploying a control program stored in the ROM 204 or the storage 205 in the RAM 203 and executing the deployed control program. The RAM 203 is a main storage memory of the CPU 202 and is used as a work area and as a temporary storage area for deploying various control programs stored in the ROM 204 and the storage 205. The ROM 204 stores control programs executable by the CPU 202. The storage 205 stores print data, image data, various programs, an address book (FIG. 16), and various setting information.

It is assumed that in the image forming apparatus 101 according to the first embodiment, one CPU 202 executes each of the processes indicated in the flowcharts described later, by using one memory (RAM 203), but other embodiments may be adopted. For example, a plurality of CPUs, RAMs, ROMs, and storages may cooperate to execute the respective processes illustrated in the flowcharts described below. In addition, some processes may be executed by using hardware circuitry such as an Application Specific Integrated Circuit (ASIC) or a Field-Programmable Gate Array (FPGA).

The network I/F 206 is an interface for enabling the image forming apparatus 101 to communicate with an external apparatus via the network 105. The image forming apparatus 101 transmits electronic data read by a scanner 212 to the cloud server 104 or any server on the network 105 via the network I/F 206. In addition, the image forming apparatus 101 can receive electronic data managed by the cloud server 104 or a server somewhere on the network 105 via the network I/F 206, and print the electronic data by a print engine 210.

An operation panel 208 displays screens controlled by the operation panel I/F 207, and when the user operates the operation panel 208, the image forming apparatus 101 obtains events corresponding to the user operation via the operation panel I/F 207. The print controller 209 is connected to the print engine 210. The image data to be printed is transferred to the print engine 210 via the print controller 209. The print engine 210 receives control commands and image data to be printed via the print controller 209, and then forms an image based on the image data on a sheet. Configuration may be taken such that the printing method of the print engine 210 is an electrophotographic method or an inkjet method. In the electrophotographic method, an electrostatic latent image is formed on a photoreceptor, developed with toner, the toner image is transferred to a sheet, and the transferred toner image is fixed to form an image. On the other hand, in the case of the inkjet method, an image is formed on a sheet by ejecting ink.

The scan controller 211 is connected to the scanner 212. The scanner 212 reads an image on a sheet (original document) and generates image data. The image data generated by the scanner 212 is stored in the storage 205. Further, the image forming apparatus 101 can form an image on a sheet using the image data generated by the scanner 212. The scanner 212 includes a document feeder (not shown), and can read sheets that have been placed on the document feeder while the sheets are being conveyed one by one.

The facsimile controller 213 executes a facsimile transmission function for transmitting, via a public line (not shown), an image read by the scanner 212 to another terminal connected to the public line. In addition, a facsimile communication control is performed in order to realize a facsimile reception print function for printing by the print engine 210 facsimile data received via the public line from another terminal connected to the public line.

The image processing unit 214 performs control related to image processing such as an enlargement/reduction of the size of image data obtained by scanning by the scanner 212, conversion processing, processing for converting image data received from an external device including a FAX into print data that can be printed by the print engine 210, and Optical Character Recognition (OCR) processing of an image.

FIG. 3 is a block diagram for describing a hardware configuration of the information terminal 102 according to the first embodiment.

The information terminal 102 includes a CPU 302, a RAM 303, a ROM 304, a storage 305, a network I/F 306, an operating unit 307, and a display unit 308 connected to a system bus 301. The CPU 302 is a central processing unit that controls the overall operation of the information terminal 102. The RAM 303 is a volatile memory. The ROM 304 is a non-volatile memory and stores a boot program of the CPU 302. The storage 305 is a storage device (for example, a hard disk drive: HDD) having a larger capacity than that of the RAM 303. Configuration may be taken such that the storage 305 is a solid state drive (SSD) or the like, or is replaced with another storage device having a function equivalent to that of a hard disk drive.

The CPU 302 executes the boot program stored in the ROM 304 when activated such as when the power is turned on. The boot program is for reading out a control program stored in the storage 305 and deploying the control program on the RAM 303. When the CPU 302 executes the boot program, it then executes the control program deployed on the RAM 303 and thereby controls the information terminal 102. The CPU 302 also stores data used when the control program is executed in the RAM 303 and reads and writes the data. Further various settings required when the control program is executed can be stored on the storage 305, and are read and written by the CPU 302. The CPU 302 communicates with other devices on the network 105 via the network I/F 306. In addition, the information terminal 102 can receive the content of an operation/input/instruction performed by the user by the operating unit 307. Also, the information terminal 102 can display the content controlled by the CPU 302 on the display unit 308.

FIG. 4 is a block diagram for describing a hardware configuration of the voice control apparatus 103 according to the first embodiment. Since the configurations of the voice control apparatuses 106 and 107 are also the same, an example of the voice control apparatus 103 is described here.

A controller unit 400 includes a CPU 402, a RAM 403, a ROM 404, a storage 405, a network I/F 406, a microphone I/F 407, an audio controller 409, and a display controller 411. These are connected to a system bus 401 and can communicate with each other. Further, a microphone 408 as a voice input device, a speaker 410 as a voice output device, and an LED 412 as a notification device are included as devices associated with the controller unit 400.

The CPU 402 is a central processing unit that controls the overall operation of the controller unit 400. The RAM 403 is a volatile memory. The ROM 404 is a non-volatile memory and stores a boot program of the CPU 402 and a serial number which is an ID for specifying a voice control apparatus. The storage 405 is a storage device (e.g., SD card) having a larger capacity than that of the RAM 403. The storage 405 stores a control program of the voice control apparatus 103 executed by the controller unit 400 and a service URL of a service used by the voice control apparatus 103. Configuration may be taken such that the storage 405 is replaced with a flash ROM or the like other than an SD card, or is replaced with another storage device having a function equivalent to that of an SD card.

The CPU 402 executes a boot program stored in the ROM 404 when activated such as when the power is turned on. The boot program is for reading out a control program stored in the storage 405 and deploying the control program on the RAM 403. When the CPU 402 executes the boot program, it continues to execute the control program deployed on the RAM 403 and controls the voice control apparatus 103. The CPU 402 also stores data used when the control program is executed in the RAM 403 and reads and writes the data. Further various settings and the like required when the control program is executed can be stored on the storage 405, and are read and written by the CPU 402. The CPU 402 communicates with other devices on the network 105 via the network I/F 406. The network I/F 406 includes, for example, circuits/antennas for performing communication in accordance with a wireless communication method compliant with an IEEE 802.11 standard series. However, communication may be performed in accordance with a wired communication method compliant with an Ethernet standard instead of the wireless communication method, and is also not limited to the wireless communication method.

The microphone I/F 407 is connected to the microphone 408, and converts voice uttered by the user which has been inputted from the microphone 408 into encoded voice data, and holds the encoded voice data in the RAM 403 in accordance with an instruction from the CPU 402. The microphone 408 is, for example, a small MEMS microphone incorporated in a smart phone or the like, but may be replaced with another device as long as it can obtain the voice of the user. Also, it is preferable that three or more microphones 408 are arranged at predetermined positions so as to enable calculation of the direction of arrival of the voice uttered by the user. However, even if the microphone 408 is only one microphone, the present embodiment can be realized, and there is no limitation to three or more microphones.

The audio controller 409 is connected to the speaker 410, and converts voice data into an analog voice signal and outputs voice through the speaker 410 in accordance with an instruction from the CPU 402. The speaker 410 plays back an apparatus response sound indicating that the voice control apparatus 103 is responding and the voice synthesized by the voice control apparatus 103. The speaker 410 is a general-purpose device for playing back audio.

The display controller 411 is connected to the LED 412 and controls lighting of the LED 412 in accordance with an instruction from the CPU 402. Here, the display controller 411 mainly performs lighting control of the LED in order to indicate that the voice control apparatus 103 has correctly inputted the voice of the user. The LED 412 is, for example, a blue LED that is visible to the user or the like. The LED 412 is a general-purpose device. In the case of a smart phone, a display capable of displaying characters and pictures may be employed instead of the LED 412.

Figure 5:
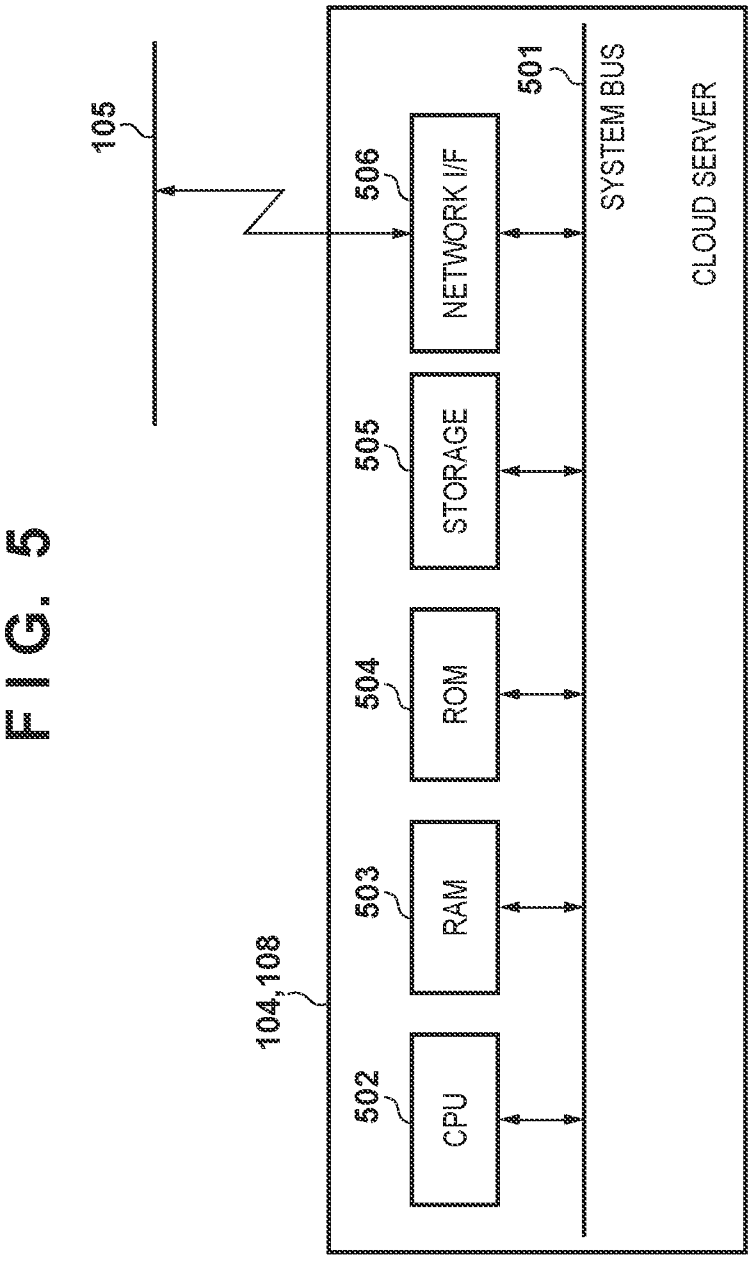
FIG. 5 is a block diagram for describing a hardware configuration of a cloud server according to the first embodiment.

FIG. 5 is a block diagram for describing a hardware configuration of the cloud server 104 according to the first embodiment.

The cloud server 104 includes a CPU 502, a RAM 503, a ROM 504, a storage 505, and a network I/F 506 connected to a system bus 501. The CPU 502 is a central processing unit that controls the entire operation of the cloud server 104. The RAM 503 is a volatile memory. The ROM 504 is a non-volatile memory and stores a boot program of the CPU 502. The storage 505 is a storage device (for example, a hard disk drive: HDD) having a larger capacity than that of the RAM 503. Configuration may be taken such that the storage 505 is a solid state drive (SSD) or the like, or is replaced with another storage device having a function equivalent to that of a hard disk drive. The CPU 502 communicates with other devices on the network 105 via the network I/F 506.

The hardware configuration of the device management server 108 is also similar to the hardware configuration of the cloud server 104, and thus description thereof is omitted.

FIG. 6 is a sequence diagram for describing one example of setting processing of the voice control apparatus according to the first embodiment.

The user logs into the service provided by the cloud server 104 on the Web browser of the information terminal 102 with the tenant ID "AAA" and the password "asdfzxcv", and establishes a login session between the information terminal 102 and the cloud server 104. Then, a setting sequence of the voice control apparatus is started by selecting a setting of the voice control apparatus from a service menu list (not shown) on the Web browser while a session ID "123456" corresponding to the login session is held in the RAM 203 of the information terminal 102.

First, in step S601, the CPU 302 of the information terminal 102 transmits, to the cloud server 104 via the network I/F 306, a request to obtain the list of devices to which the session ID has been assigned.

In this way, in step S602, a CPU 502 of the cloud server 104 obtains, from a setting table (FIG. 14) of the voice control apparatus stored in the storage 505, information of a service cooperation device associated with the tenant ID "AAA" corresponding to the session ID "123456" notified in step S601.

FIG. 14 depicts a view illustrating one example of a setting table of the voice control apparatus according to the embodiment.

In FIG. 14, the tenant IDs and the device IDs are associated and registered, and the security levels of each of the devices are also registered. Here, in step S602, the device IDs "Smart Speaker A", "Smart Speaker B", and "Smart Speaker C" of the service cooperation devices associated with the tenant ID "AAA" are obtained.

Next, in step S603, the CPU 502 of the cloud server 104 generates a device selection screen 701 (FIG. 7) of the device IDs "Smart Speaker A", "Smart Speaker B", and "Smart Speaker C" obtained in step S602, and transmits HTML format data for the device selection screen 701 to the information terminal 102. Thus, in step S604, the CPU 302 of the information terminal 102 displays the device selection screen 701 (FIG. 7) received in step S603 onto the display unit 308.

Figure 7:
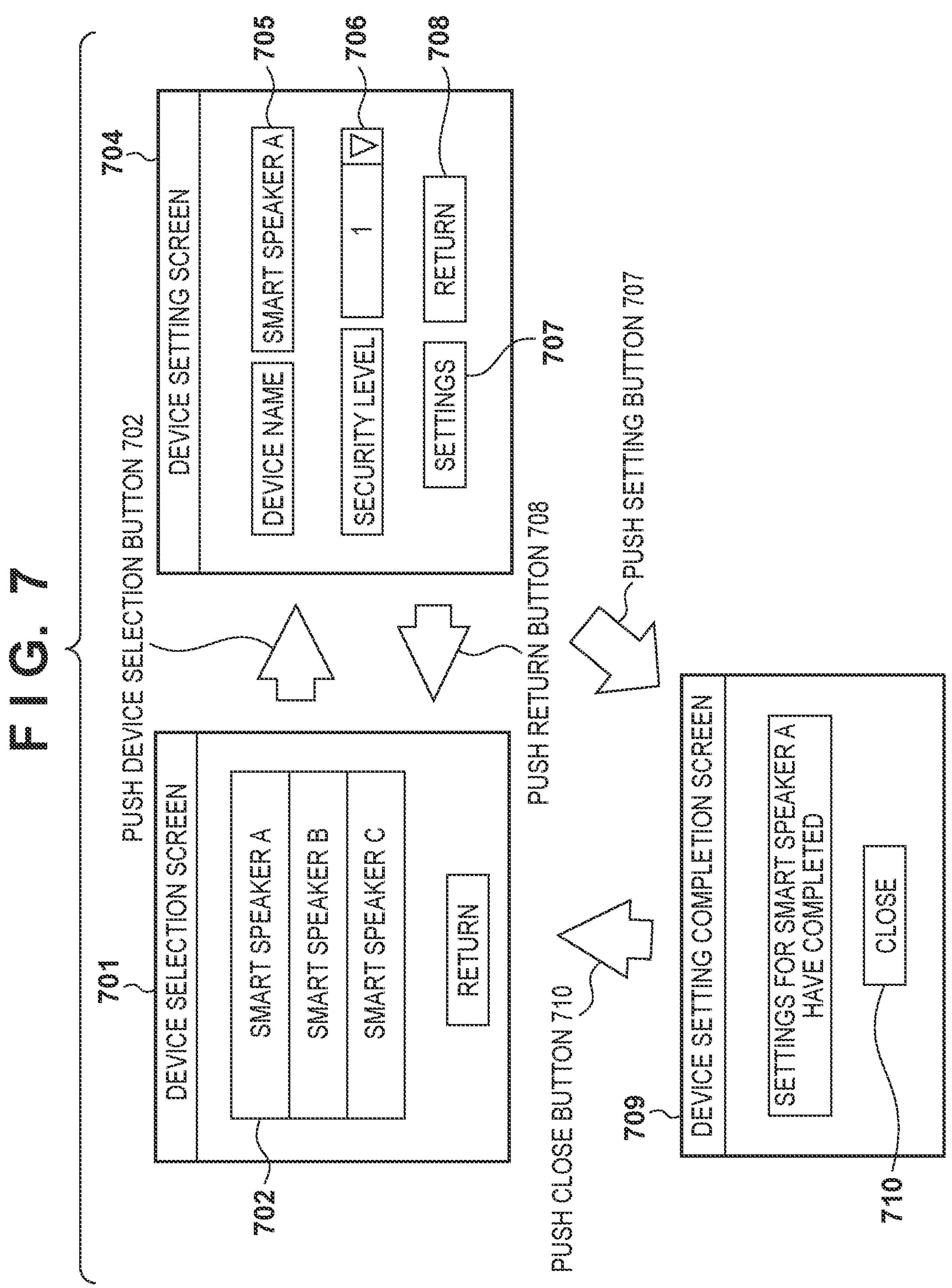
FIG. 7 depicts a view for describing transitions of device setting screens displayed on the information terminal according to the first embodiment.

FIG. 7 depicts a view for describing transitions of device setting screens displayed on the information terminal 102 according to the embodiment.

In FIG. 7, the device selection screen 701 displays device information corresponding to the tenant ID "AAA", and any one of the device IDs "Smart Speaker A", "Smart Speaker B", and "Smart Speaker C" can be selected.

Then, in step S605, the user presses "Smart Speaker A" of device selection buttons 702 on the device selection screen 701 on the Web browser via the operating unit 307 of the information terminal 102. By this, the CPU 302 of the information terminal 102 in step S606 transmits a request for obtainment of a device setting screen to which the session ID "123456" and the device ID "Smart Speaker A" are added to the cloud server 104 via the network I/F 306. Then, in step S607, the CPU 502 of the cloud server 104 obtains setting information corresponding to the tenant ID "AAA" and the device ID "Smart Speaker A" from a voice control device setting table (FIG. 14) of the storage 505. Then, in step S608, the CPU 502 of the cloud server 104 generates a device setting screen 704 (FIG. 7) corresponding to the setting information of the device ID "Smart Speaker A" obtained in step S607, and transmits the HTML format data or the device setting screen 704 to the information terminal 102. Thus, in step S609, the CPU 302 of the information terminal 102 displays the device setting screen 704 received in step S608 onto the display unit 308. In the device setting screen 704, a name and security level of the device can be set. In FIG. 7, "Smart Speaker A" is set in device name 705 of the device setting screen 704. The security level can be set from a list box 706.

Then, in step S610, the user selects "1" from the list box 706 of security levels of the device setting screen 704 on the Web browser by the operating unit 307 of the information terminal 102, and then presses a setting button 707. By this, the CPU 302 of the information terminal 102 in step S611 notifies device setting information assigned to the session ID "123456" and the device ID "a Smart Speaker A" to the cloud server 104 via the network I/F 306. Thus, the CPU 502 of the cloud server 104 in step S612 associates the setting information notified in step S611 with the tenant ID "AAA" and stores it in the voice control device setting table (FIG. 14) of the storage 505.

Next, in step S613, the CPU 502 of the cloud server 104 generates a device setting completion screen 709 of FIG. 7 and transmits the HTML format data for the device setting completion screen 709 to the information terminal 102. Thus, in step S614, the CPU 302 of the information terminal 102 displays the device setting completion screen 709 received in step S613 onto the display unit 308. The device setting completion screen 709 displays a message indicating that the setting of the smart speaker A has been completed. Here, when a close button 710 is pressed, the device selection screen 701 is returned to. Also, when a return button 708 is pressed on the device setting screen 704, the device selection screen 701 is returned to.

By this processing, the user can select a service cooperation device and set the name and security level of the device.

Figure 8:
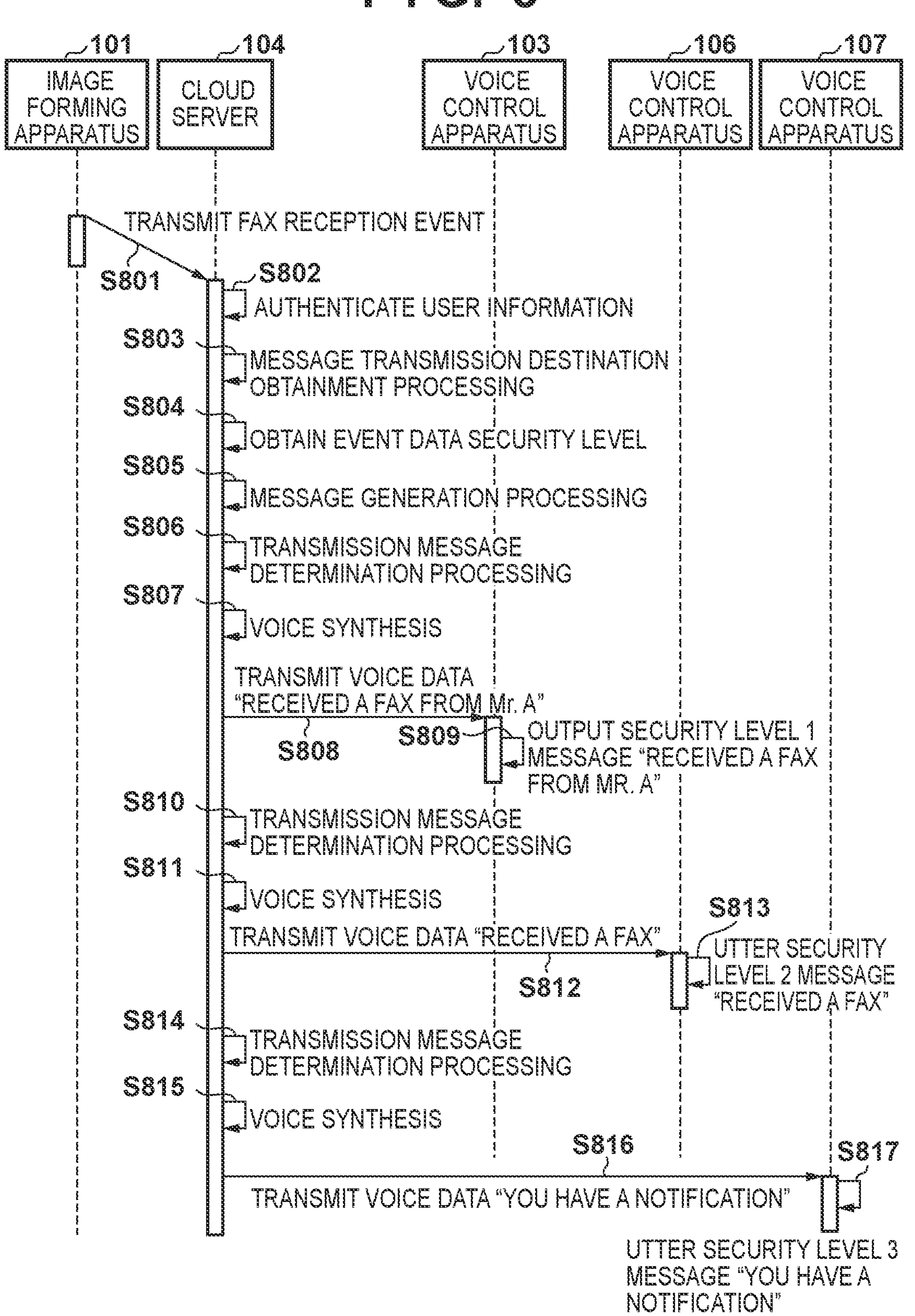
FIG. 8 is a sequence diagram for describing an example of a FAX reception message notification according to the first embodiment of the present invention.

FIG. 8 is a sequence diagram for describing an example of a FAX reception message notification according to the first embodiment of the present invention. In the first embodiment, address information in which a transmission source name "A" is associated with a FAX number "1111" is stored in an address book (FIG. 16) in the storage 205 of the image forming apparatus 101. Then, when a FAX is received from the FAX number "1111", a notification sequence of the FAX reception message illustrated in FIG. 8 is started.

In step S801, when the CPU 202 of the image forming apparatus 101 detects that a FAX reception event has occurred, it obtains a transmission source "A" obtained from the address book (FIG. 16) of the storage 205 based on the received FAX number "1111". Also, the ID "AAA", the password "asdfzxcv", and the device ID "MFP1" stored in the storage 205 are obtained. Then, based on these, a FAX reception event message (FIG. 9) is generated and transmitted, via the network 105, to the service URL "http://service1.com" of the cloud server 104 stored in the storage 205.

FIG. 9 depicts a view illustrating one example of a FAX reception event message.

In FIG. 9, it is illustrated that the image forming apparatus 101 of the ID "AAA", the password "asdfzxcv", and the device ID "MFP1" has received a FAX from a Mr. "A".

Figure 17:
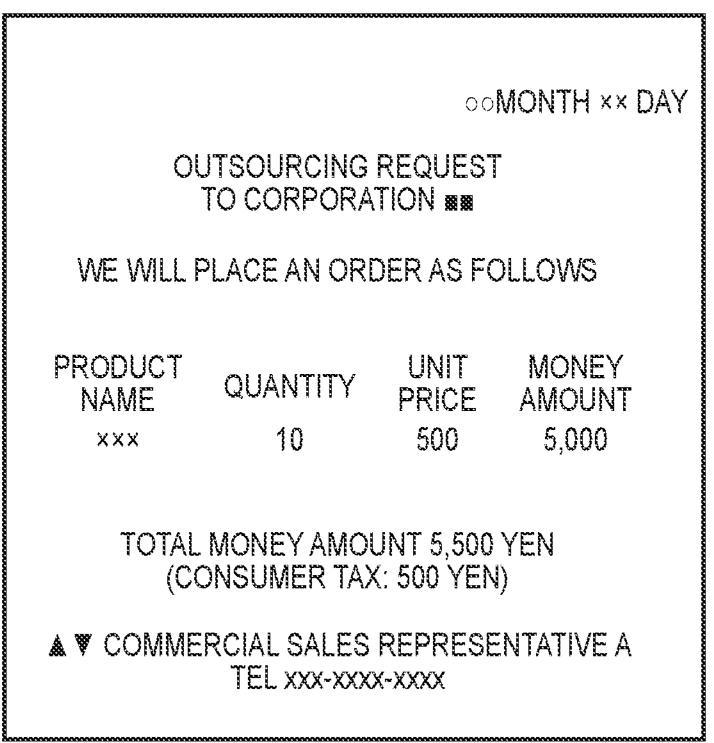
FIG. 17 depicts a view illustrating an example of a FAX image received by the image forming apparatus according to the first embodiment.

Here, in a case where the received FAX number does not exist in the address book (FIG. 16) of the storage 205, a character string corresponding to the transmission source may be extracted from the received FAX image (FIG. 17) by executing FAX image OCR processing (FIG. 18) which is described later, and the extracted character string "A" may be used as the transmission source. Alternatively, in a case where the character string corresponding to the transmission source cannot be extracted, the FAX number "1111" of the transmission source may be notified to the cloud server 104 as a parameter.

In step S802, the CPU 502 of the cloud server 104 confirms whether the tenant ID "AAA" and the password "asdfzxcv" are stored in the storage 505 of the cloud server 104 using a message of the FAX reception event received in step S801. Specifically, it is determined whether or not the image forming apparatus 101 is registered in the service provided by the cloud server 104. When it is stored, i.e., if the authentication is successful, it is determined that the user information is correct.

When the user information of the FAX reception event message transmitted in step S801 is determined to be the correct user information, the FAX reception event message is stored in "Event Message" in the RAM 503. In step S803, the CPU 502 of the cloud server 104 specifies the voice control apparatuses 103, 106, and 107 that cooperate with this service.

Next, in step S804, the CPU 502 of the cloud server 104 executes event data security level obtainment processing (FIG. 10), which is described later, to obtain a security level "1" of the event data of the FAX reception event message transmitted in step S801. Next, in step S805, the CPU 502 of the cloud server 104 generates a message for each security level with the security level of the event obtained in step S804 as the highest level. Here, since the event data security level is "1", a message security level "1" is stored in the RAM 503, and message generation processing (FIG. 11) described later is executed. The message "Received a FAX from Mr. A" generated in this way is stored in "Security Level 1 Message" in the RAM 503. Also, a message security level "2" is stored in the RAM 503, and a message "Received a FAX" generated by executing the message generation processing (FIG. 11) is stored in "Security Level 2 Message" in the RAM 503. Further, a message security level "3" is stored in the RAM 503, and a message "Received a message" generated by executing the message generation processing (FIG. 11) is stored in "Security Level 3 Message" in the RAM 503.

Then, in step S806, the CPU 502 of the cloud server 104 determines that a message "Received a FAX from Mr. A" of "Security Level 1 Message" in the RAM 503 is a message to be transmitted to the voice control apparatus 103 since the device security level of the voice control apparatus 103 is "1". Then, in step S807, the CPU 502 of the cloud server 104 converts the message "Received a FAX from Mr. A" determined in step S806 into voice data. Then, in step S808, the CPU 502 of the cloud server 104 transmits the voice data "Received a FAX from Mr. A" generated in step S807 to the voice control apparatus 103 via the network 105. As a result, in step S809, the CPU 402 of the voice control apparatus 103 outputs the voice data "Received a FAX from Mr. A" received in step S808 from the speaker 410 via the audio controller 409.

As described above, in a case where the device security level of the voice control apparatus 103 is "1" and the security level of the event data is "1", the voice control apparatus 103 outputs the voice data "Received a FAX from Mr. A" which includes the address "Mr. A" who has a high security level and including the event "FAX received".

Then, in step S810, the CPU 502 of the cloud server 104 determines that a message "Received a FAX" of "Security Level 2 Message" in the RAM 503 is a message to be transmitted to the voice control apparatus 106 since the device security level of the voice control apparatus 106 is "2". Then, in step S811, the CPU 502 of the cloud server 104 converts the message "Received a FAX" determined in step S810 into voice data. Then, in step S812, the CPU 502 of the cloud server 104 transmits the voice data "Received a FAX" generated in step S811 to the voice control apparatus 106 via the network 105. As a result, in step S813, the CPU of the voice control apparatus 106 outputs the voice data "Received a FAX" received in step S812 from the speaker via the audio controller.

As described above, in a case where the device security level of the voice control apparatus 106 is "2", the voice data "Received a FAX" including "Received a FAX" which does not include the address "Mr. A" who has a high security level is outputted.

Then, in step S814, the CPU 502 of the cloud server 104 determines that a message "You have a notification" of "Security Level 3 Message" in the RAM 503 is a message to be transmitted to the voice control apparatus 107 since the device security level of the voice control apparatus 107 is "3". Then, in step S815, the CPU 502 of the cloud server 104 converts the message "You have a notification" determined in step S814 into voice data. Then, in step S816, the CPU 502 of the cloud server 104 transmits the voice data "You have a notification" generated in step S815 to the voice control apparatus 107 via the network 105. As a result, in step S817, the CPU of the voice control apparatus 107 outputs the voice data "You have a notification" received in step S816 from the speaker via the audio controller.

As described above, in a case where the device security level of the voice control apparatus 107 is "3", "You have a notification", which does not include the address "Mr. A" and does not include "Received a FAX" corresponding to the security levels "1" and "2" is outputted.

By the above explained processing, when the image forming apparatus 101 receives a FAX, it is possible to output and notify a message in accordance with to the security level of the voice control apparatus by voice by the cooperating voice control apparatus.

Figure 18:
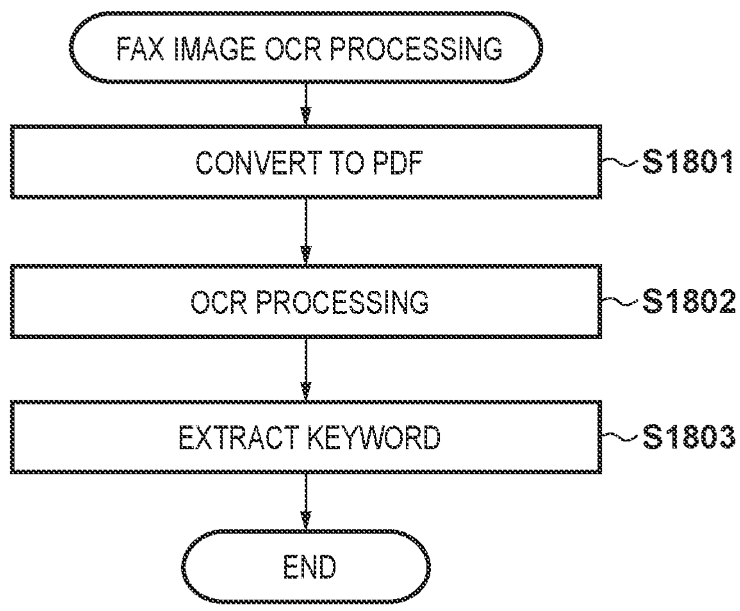
FIG. 18 is a flowchart for describing OCR processing of a FAX image executed by the image forming apparatus according to the first embodiment.

FIG. 18 is a flowchart for describing OCR processing of a FAX image executed by the image forming apparatus 101 according to the first embodiment. Here, the FAX image (FIG. 17) is stored in the storage 205 prior to performing OCR processing of the FAX image, and keywords for extracting a character string are stored in the RAM 203. The processing illustrated in this flowchart is achieved by the CPU 202 executing a program deployed in the RAM 203. As described above, this processing is executed in a case where the received FAX number is not registered in the image forming apparatus 101, and in a case where information of the transmission source is obtained from the received FAX image.

First, in step S1801, the CPU 202 controls the image processing unit 214 to convert the FAX image (FIG. 17) of the storage 205 into a PDF file. Next, the processing advances to step S1802, and the CPU 202 controls the image processing unit 214 to execute OCR processing (not shown)

on the PDF file converted in step S1801. By this, a character string and a position where the character string is recorded are obtained from the PDF file. One example of a method for obtaining the position of the character string is a method of expressing using the number of pixels in the main scanning direction and in the sub-scanning direction to the top left of an area determined to be a character string image from the top left of the image which is used as the origin.

Next, the processing advances to step S1803, and the CPU 202 obtains a character string corresponding to a keyword from the character string obtained in step S1802. As one example of a method for obtaining the character string, an image file serving as a template is stored in the storage 205, and in a case where the received FAX image is an image file matching the template, a position of the keyword corresponding to the template stored in the storage 205 is obtained. Also, although a method in which a character string in the vicinity of the position of a keyword is treated as a corresponding character string is given as an example, detailed description thereof is omitted since this is not essential to the technique of the present invention.

FIG. 10 is a flowchart for describing processing for obtaining an event data security level executed by the cloud server 104 according to the first embodiment in step S804 of FIG. 8. In the first embodiment, an area enclosed by "<" and ">" of the message template is defined as a message attribute portion. The processing indicated in this flowchart is achieved by the CPU 502 executing a program which has been deployed into the RAM 503.

In step S1001, the CPU 502 obtains an event that is stored in the RAM 503, which is for example, a character string enclosed by "<Event>" and "</Event>" in "Event Message" of FIG. 9. Then, the security level corresponding to the event is obtained from the event section table (FIG. 13A). Here, since the event is "FaxReceive", the security level "2" corresponding to this event obtained from the FIG. 13A is made to be the event security level.

Next, the processing advances to step S1002, and the CPU 502 obtains a parameter attribute (here, "From") that is an area enclosed by "<" and ">" from a parameter portion that is a character string enclosed by "<Param>" and "</Param>" in "Event Message" of FIG. 9. Then, from FIG. 13B, the maximum value of the security level corresponding to the parameter attribute is obtained and set as a parameter security level. For example, in a case of the FAX reception event message of FIG. 9, since the security level corresponding to the parameter "From" is "1" in the parameter section table (FIG. 13B), the parameter security level is "1". Here, in a case where there are a plurality of parameter attributes in the parameter portion, the security level corresponding to each parameter of each parameter attribute portion is obtained from the parameter section table (FIG. 13B), and the highest security level among them is set as the parameter security level.

Then, the processing advances to step S1003, and the CPU 502 compares the event security level obtained in step S1001 with the parameter security level obtained in step S1002, and sets the higher one as the security level of the event data. For example, in the case of the FAX reception event message of FIG. 9, since the event security level is "2" and the security level corresponding to the parameter "From" is "1", the event data security level is "1". In this way, the cloud server 104 can set the security level corresponding to the event that has occurred.

FIG. 11 is a flowchart for describing message generation processing executed by the cloud server 104 according to the first embodiment. In the first embodiment, an area enclosed by "$" in the section data is defined as a variable area, and an area enclosed by "<" and ">" in the message template is defined as a message attribute portion. The processing indicated in this flowchart is achieved by the CPU 502 executing a program which has been deployed into the RAM 503.

In step S1101, the CPU 502 obtains "Event Message" from the RAM 503. Next, the processing advances to step S1102, and the CPU 502 executes processing for obtaining a section data list of FIG. 12, which is described later, to obtain a section data list. For example, in a case where "Event Security Level" in the RAM 503 is "1" and "Event Message" is the FAX reception event message of FIG. 9, the section list is {"Event: Received a FAX", "From: from Mr. $From$"}.

Next, the processing advances to step S1103, and the CPU 502 converts the variable area of the section data into the corresponding parameter value stored in "Event Message" of the RAM 503. Here, for example, the section data "From: from Mr. $From$" is converted to "From: from Mr. A". Next, the processing advances to step S1104, and the CPU 502 obtains, from the storage 505, a message template corresponding to the event which is a string enclosed by "<Event>" and "</Event>" in "Event Message" in the RAM 503. For example, in a case where the event is "FaxRecieve", the FAX reception message template "<From><Event>" is obtained. In a case where the event is "Alert", an alert message template "<DeviceID><Cause><Event>" is obtained.

Next, the processing advances to step S1105, and the CPU 502 rewrites the parameter of the message template obtained in step S1104 into the section converted in step S1103. In a case where "Section Data List" {"Event: Received a FAX", "From: from Mr. A"} is replaced with the FAX reception message template "<From><Event>", "<From>" is converted into "from Mr. A", and "<Event>" is converted into "Received a FAX". In this way, the message "Received a FAX from Mr. A" is generated. If the section in the section data is "NULL", the attribute part is converted to an empty character. For example, if the section list is {"Event: Received a FAX"}, "<From>" in the message template "<From><Event>" is converted to an empty character. Thus, the message "Received a FAX" is generated. Also, if section data does not exist in the section list, a generic message "You have a notification" is generated. Further, if there is no corresponding attribute in the section data, the attribute part is converted into an empty character. For example, in a case where the section data is only "Event: Received a FAX", a message "Received a FAX" is generated since the FAX reception message template "<From>" of "<From><Event>" is converted into an empty character.

FIG. 12 is a flowchart for describing processing, that the cloud server 104 executes, for obtaining the section data list of step S1102 of FIG. 11 according to the first embodiment.

In step S1201, the CPU 502 sets "Event", which is a character string enclosed by "<Event>" and "</Event>" in "Event Message" in the RAM 503, as a key. Then, the "Section" and "Security Level" corresponding to this key ("FaxReceive" in the example of FIG. 9) are obtained from the event section table of FIG. 13A and stored in the RAM 503.

Next, the processing advances to step S1202, and the CPU 502 executes section obtainment processing described later with reference to FIG. 15, and in a case where the obtained section is not an empty character, the CPU 502 stores "Section Data" comprising "Attribute Name" and "Section" in the event section in the RAM 503. For example, in the FAX reception event message example (FIG. 9), the section "Received a FAX" obtained in section obtainment processing (FIG. 15) is set to "Section", while the event "FaxReceive" is set to "Attribute Name".

Next, the processing advances to step S1203, and the CPU 502 obtains a parameter attribute that is an area enclosed by "<" and ">" from a parameter portion which is a character string enclosed by "<Param>" and "</Param>" in "Event Message" in the RAM 503. Also, a sub-table "Section Security Table" for "Section" and "Security Level" is obtained from the parameter section table of FIG. 13B and stored in the RAM 503 using "Parameter Attribute" as a key.

Figures 15, 16:
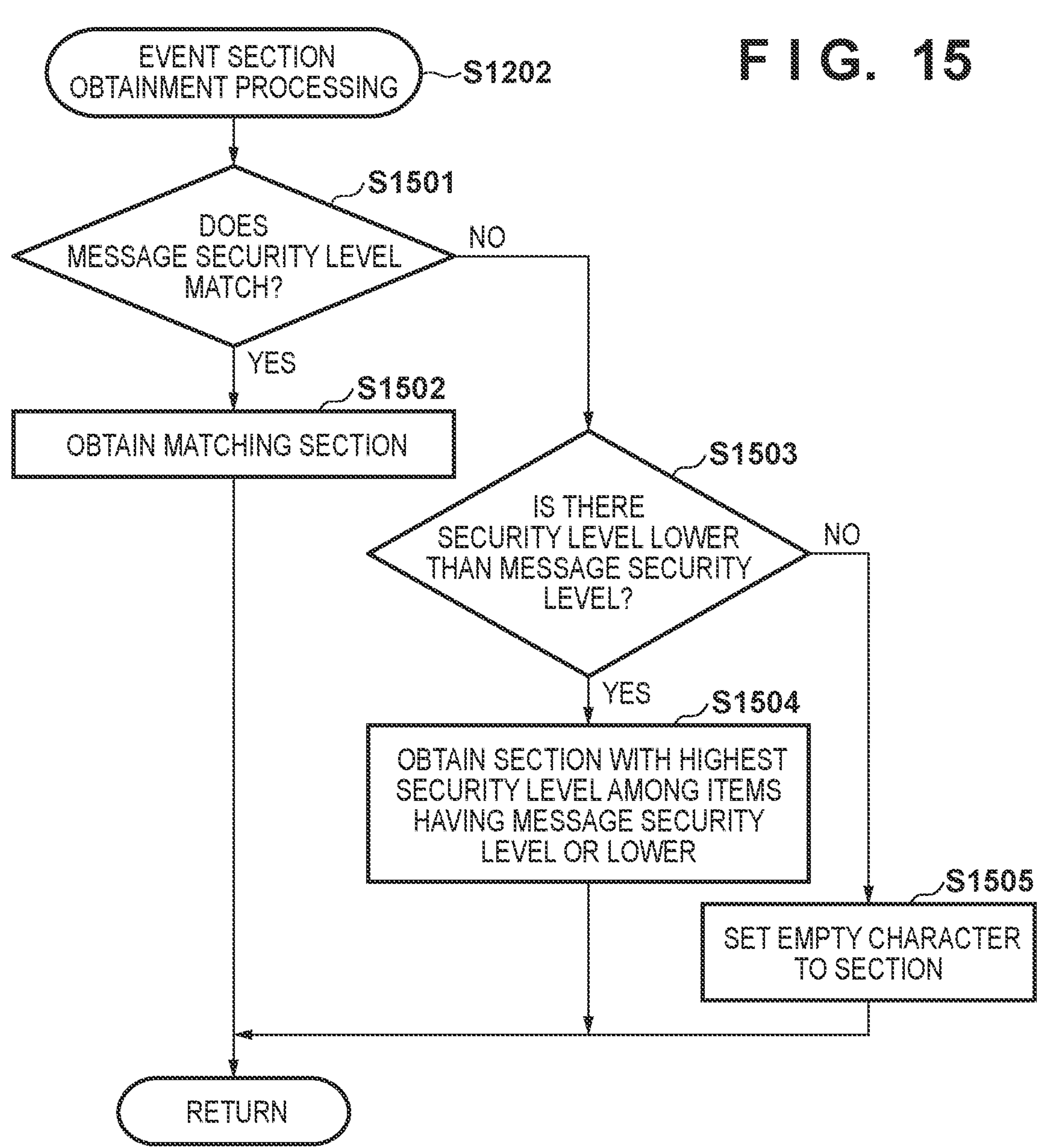
FIG. 15 is a flowchart for describing processing, that the cloud server executes, for obtaining an event section of step S1202 according to the first embodiment.
FIG. 16 depicts a view illustrating one example of an address book according to the first embodiment.

In step S1204, in a case where the CPU 502 executes the section obtainment processing of FIG. 15 and the obtained section is not an empty character, the CPU 502 stores "Section Data" comprising "Attribute Name" and "Section" in a parameter section list in the RAM 503. For example, in a case where "Message Security Level" is "1" and the parameter is "From", "From" is set to "Attribute Name" and the section "From Mr. $From $" obtained by the section obtainment processing is set to "Section". Here, in a case where there are a plurality of parameters in the parameter attribute portion, step S1203 and step S1204 are executed for each parameter.

Next, the processing advances to step S1205, and the CPU 502 makes the event section obtained in step S1202 and the parameter section obtained in step S1204 into a list, and stores the list in "Section List" in the RAM 503. For example, in a case where "Event Security Level" in the RAM 503 is "1" and "Event Message" is the FAX reception event message of FIG. 9, the section list is {"Event: Received a FAX", "From: from Mr. $From$"}.

FIG. 15 is a flowchart for describing processing, that the cloud server 104 executes, for obtaining an event section of step S1202 according to the first embodiment.

In step S1501, the CPU 502 determines whether a security level that matches "Event Security Level" in the RAM 503 exists in "Section Security Table" in the RAM 503. Here, when it is determined that there is a security level that matches "Event Security Level" in the RAM 503, the processing advances to step S1502, and the CPU 502 obtains "Section" corresponding to "Event Security Level" in the RAM 503 from "Section Security Table" in the RAM 503 and stores it in "Section" in the RAM 503, and then ends the processing.

On the other hand, in step S1501, when the CPU 502 determines that there is no security level matching "Event Security Level" in the RAM 503, the processing advances to step S1503, and the CPU 502 determines whether there is an item having a security level lower than the message security level. In a case where it is determined that there is an item having a security level lower than the message security level, the processing advances to step S1504. In step S1504, the CPU 502 obtains, from "Section Security Table" in the RAM 503, "Section" corresponding to the item having the highest security level from among the items having the security level lower than "Event Security Level" in the RAM 503. Then, this is stored in "Section" in the RAM 503 and then the processing ends. On the other hand, in step S1503, when it is determined that an item with a security level lower than the message security level does not exist, the processing advances to step S1505, and the CPU 502 stores "NULL" in "Section" in the RAM 503 and ends the processing.

In the first embodiment described above, the notification sequence of the FAX reception message is shown as a method of transmitting the message to the voice control apparatus, but the present invention is not limited thereto. Although a method of analyzing an attribute in an event message has been described as a means of determining the security level of the message, the present invention is not limited to this. For example, natural language processing may be performed on the notification message, and when a word having a high security risk is included in the voice audio output content, it may be determined that the message security level is a high level.

As described above, according to the first embodiment, by switching the message to be transmitted to the voice control apparatus by using the device security level and the message security level, it is possible to decrease the risk of an information leak caused by output of voice audio by the voice control apparatus.

As another example, configuration may be taken such that a security level is provided for a user who uses the service, and the voice audio output content is changed according to a combination of the security level of the device and a secure microcomputer of the user.

Second Embodiment

FIG. 21 depicts a view illustrating one example of a configuration of an information processing system according to a second embodiment of the present invention. The same components as those in the first embodiment described above are denoted by the same reference numerals, and the description thereof is omitted.

The information processing system includes, for example, the image forming apparatus 101, the information terminal 102, the voice control apparatuses 103, 106, and 107, the cloud server 104, and the network 105. The image forming apparatus 101, the information terminal 102, the voice control apparatuses 103, 106, and 107, and the cloud server 104 can communicate with each other via the network 105. Configuration may be taken such that the image forming apparatus 101 and the information terminal 102 are connected with a plurality of connections rather than a single connection, and configuration may be taken such than two or less of the voice control apparatuses 103, 106, and 107 are connected or such that two or more of the voice control apparatuses 103, 106, and 107 are connected.

A device management server 108 is configured by one or more servers, and has a function of managing various setting values of the voice control apparatuses 103 and 106, a network connection environment, installation location information, and the like, and returning the managed information in accordance with requests from the cloud server 104.

The device management server 108 and the voice control apparatus 106 are connected to the network 105 via a router 2100. In general, a security barrier such as a firewall is provided between the router 2100 and the network 105, and external/internal access control is performed thereby. Further, the voice control apparatus 103 and the image forming apparatus 101 are connected to the router 2100 via a router 2101, and are further connected to the network 105 via the router 2100.

In the second embodiment, IoT devices that cooperate with the cloud service are the image forming apparatus 101 and the voice control apparatuses 103, 106, and 107, and a device ID "MFP1" is stored in the storage 205 of the image forming apparatus 101. Further, assume that the device ID "Smart Speaker A" is stored in the storage 405 of the voice control apparatus 103 and the device ID "Smart Speaker B" is stored in the storage 4 of the voice control apparatus 106. Also, the user has registered in advance a user ID "AAA"

and a password "asdfzxcv" for using the service provided by the cloud server 104. The user performs "a cloud service cooperation setting" which is a setting for having an IoT device and the cloud service cooperate on a Web browser of the information terminal 102. A device ID "MFP1" and an IP address "192.168.100.1" of the image forming apparatus 101, a device ID "Smart Speaker A" and an IP address "192.168.100.2" of the voice control apparatus 103, a device ID "Smart Speaker B" and an IP address "192.168.110.3" of the voice control apparatus 106, and a device ID "Smart Speaker C" and an IP address "192.168.190.4" of the voice control apparatus 107 which are the IoT devices that cooperate are stored in the storage 505 of the cloud server 104. Also, it is assumed that the ID "AAA", the password "asdfzxcv", and a service URL "http://service1.com" which is a Uniformed Resource Locator (URL) for accessing the service provided by the cloud server 104 are stored in the storage 205 of the image forming apparatus 101 and each storage of the voice control apparatuses 103, 106, and 107.

In the second embodiment, the area security level is set for "Area", which has been classified into several categories, by using the information related to the installation location of each of the voice control apparatuses 103, 106, and 107. Zero or more voice control apparatuses are associated with one area.

In the second embodiment, the setting information of the area is managed by the cloud server 104. An example will be described in which three areas are set: a department area, an in-house area, and an outside the company area. The user can log in to the cloud server 104 on a Web browser of the information terminal 102, and then add, delete, or change area types from a service menu provided by the cloud server 104.

The department area is an area that indicates a location where only users belonging to a department that actually confirms the content of messages from devices connected to the cloud server 104 are allowed to enter. Configuration is taken such that a network device installed in this department area is connected to the router 2101 and cannot be physically connected to other department areas.

The in-house area is an area that indicates a location where users other than those belonging to a department that actually confirms the content of messages from devices connected to the cloud server 104 are allowed to enter and exit, but only users belonging to the company are allowed to enter.

In the second embodiment, a network device connected to the in-house area is connected to in-house subnet 192.168.100.0/24 or 192.168.110.0/24.

The outside the company area is an area indicating a location where users belonging to the company also enter, such as an in-company greeting room, a business negotiations location, a satellite office, or a public location. A network device connected to this outside the company area is connected to a subnet 192.168.190.0/24 or another network.

The cloud server 104 can obtain network connection status information from a connected router or other management service of the voice control apparatuses 103, 106, and 107.

FIG. 19A depicts a view illustrating classifications of areas and conditions of the classifications according to the second embodiment.

By setting the area classification in this way, the cloud server 104 can associate each area and the voice control apparatuses 103, 106, and 107.

The cloud server 104 obtains the network connection status information of the voice control apparatuses 103, 106, and 107 from the device management server 108.

FIG. 19B depicts a view illustrating a network connection status of the voice control apparatuses according to the second embodiment. In FIG. 19B, the smart speaker A corresponds to the voice control apparatus 103, the smart speaker B corresponds to the voice control apparatus 106, and the smart speaker C corresponds to the voice control apparatus 107.

The user can log in to the cloud server 104 on a Web browser of the information terminal 102 and set the area security level of the respective areas. Here, as shown in the FIG. 19C, the area security level of the department area is set to 1, the area security level of the in-house area is set to 2, and the area security level of the outside the company area is set to 3.

FIG. 22 depicts a view illustrating an example of screen transition of screens for setting a security level for each area displayed on the information terminal 102 according to the second embodiment.

In FIG. 22, an area selection screen 2201 can select one of "Department Area", "In-house Area", and "Smart Speaker C". When the area selection button 2202 for selecting "Department Area" is pressed on the area selection screen 2201, a transition is made to a setting screen 2204 for setting the security level of the selected area. Here, "Department Area" 2205 is displayed as the name of the area. Then, when a settings button 2207 is pressed after a level "1" is selected from a security level list box 2206, a transition is made to an area security level setting completion screen 2209. In this way, the security level of "Department Area" can be set. Similarly for other areas, the security level thereof can be set. When a close button 2210 is pressed on the screen 2209, the screen transitions to the area selection screen 2201. Also, when a return button 2208 is pressed on the settings screen 2204, the screen transitions to the area selection screen 2201.

FIG. 20 is a sequence diagram for describing a flow of processing when notifying a FAX reception message according to the second embodiment. In the second embodiment, address information which is information in which a transmission source name "A" is associated with a FAX transmission number "1111" is stored in an address book (FIG. 16) in the storage 205 of the image forming apparatus 101, and the notification sequence of the FAX reception message is started when a FAX from the FAX number "1111" is received.

First, in step S2001, the CPU 202 of the image forming apparatus 101 obtains the transmission source "A" from the address book (FIG. 16) in the storage 205 corresponding to the received FAX number "1111", and generates a FAX reception event message (FIG. 9) based on the ID "AAA", the password "asdfzxcv", and the device ID "MFP1" stored in the storage 205. Then, the message is transmitted to the service URL "http://service1.com" of the cloud server 104 stored in the storage 205 via the network 105.

Here, in a case where the received FAX does not exist in the address book (FIG. 16) of the storage 205, a character string corresponding to the transmission source may be extracted from the received FAX image (FIG. 17) by executing FAX image OCR processing (FIG. 18), and the extracted character string "A" may be used as the transmission source. Also, in a case where the character string corresponding to the transmission source cannot be extracted, the FAX number "1111" of the transmission source may be notified to the cloud server 104 as a parameter.

Next, in step S2002, the CPU 502 of the cloud server 104 confirms whether the tenant ID "AAA" and the password "asdfzxcv" from the FAX reception event message received in step S2001 are stored in the storage 505 of the cloud server 104, and then determines that the user information is the correct user information. Thus, when the user information of the FAX reception event message is determined to be the correct user information (i.e., successfully authenticated), the CPU 502 stores the FAX reception event message in "Event Message" in the RAM 503, and the CPU 502 specifies the voice control apparatuses 103, 106, and 107 that are cooperating in step S2003.

Next, in step S2004, the CPU 502 executes the event data security level obtainment processing (FIG. 10) to obtain an event data security level "1" of the received FAX reception event message. Next, in step S2005, the CPU 502 generates messages for each security level with the event security level obtained in step S2004 as the highest level. Here, since the event data security level is "1", a message security level of "1" is stored in the RAM 503, and the message generation processing (FIG. 11) is executed. "Received a FAX from Mr. A" generated in this way is stored in "Security Level 1 Message" in the RAM 503. Also, a message security level of "2" is stored in the RAM 503, and the message generation processing (FIG. 11) is executed. "Received a FAX" generated in this way is stored in "Security Level 2 Message" in the RAM 503. Further, a message security level of "3" is stored in the RAM 503, and the message generation processing (FIG. 11) is executed. "Received a message" generated in this way is stored in "Security Level 3 Message" in the RAM 503.

Next, in step S2006, the CPU 502 requests the device management server 108 for the network connection status information of the voice control apparatus 103. Accordingly, the device management server 108 returns the network connection status information of the voice control apparatus 103.

Next, in step S2007, the CPU 502 determines, based on the obtained network connection status information, that the voice control apparatus 103 is installed in the department area because it is connected to the router 2101 based on the conditions shown in FIGS. 19A and 19B. Here, since the area security level of the department area is "1" according to FIG. 19C, it is determined that the message "Received a FAX from Mr. A" of "Security Level 1 Message" in the RAM 503 is the message that will be transmitted to the voice control apparatus 103. Then, in step S2008, the CPU 502 converts the message "Received a FAX from Mr. A" determined in step S2007 into voice data. Then, in step S2009, the CPU 502 transmits the voice data "Received a FAX from Mr. A" generated in step S2008 to the voice control apparatus 103 via the network 105. As a result, in step S2010, the CPU 402 of the voice control apparatus 103 outputs the voice data "Received a FAX from Mr. A" received in step S2009 from the speaker 410 via the audio controller 409.

Next, in step S2011, the CPU 502 of the cloud server 104 makes a request to the device management server 108 for network connection status information of the voice control apparatus 106. Consequently, the device management server 108 returns the network connection status information of the voice control apparatus 106. Next, in step S2012, the CPU 502 determines, based on the obtained network connection status information, that the voice control apparatus 106 is installed in the in-house area because it is connected to the router 2100 based on the conditions shown in FIGS. 19A and 19B. Since the area security level of the in-house area is "2", the CPU 502 determines that the message "Received a FAX" of "Security Level 2 Message" in the RAM 503 is the message to be transmitted to the voice control apparatus 106. Then, in step S2013, the CPU 502 converts the message "Received a FAX" determined in step S2012 into voice data. Then, in step S2014, the CPU 502 transmits the voice data "Received a FAX" generated in step S2013 to the voice control apparatus 106 via the network 105. As a result, in step S2015, the CPU 402 of the voice control apparatus 106 outputs the voice data "Received a FAX" received in step S2014 from the speaker 410 via the audio controller 409.

Next, in step S2016, the CPU 502 of the cloud server 104 makes a request to the device management server 108 for the network connection status information of the voice control apparatus 107. Accordingly, the device management server 108 returns the network connection status information of the voice control apparatus 107. Next, in step S2017, the CPU 502 determines, based on the obtained network connection status information, that the voice control apparatus 107 is installed in the outside the company area because it is connected to the subnet 192.168.190.0/24 based on the conditions shown in FIGS. 19A and 19B. Since the area security level of the outside the company area is "3", it is determined that the message "You have a notification" of "Security Level 3" in the RAM 503 is the message to be transmitted to the voice control apparatus 107. Then, in step S2018, the CPU 502 converts the message "You have a notification" determined in step S2017 into voice data. Then, in step S2019, the CPU 502 transmits the voice data "You have a notification" generated in step S2018 to the voice control apparatus 107 via the network 105. As a result, in step S2020, the CPU 402 of the voice control apparatus 107 outputs the voice data "You have a notification" received in step S2019 from the speaker 410 via the audio controller 409.

As described above, according to the second embodiment, by switching the message to be transmitted to the voice control apparatus by using the area security level and the message security level, it is possible to decrease the risk of an information leakage caused by an output of voice audio by the voice control apparatus. Further, since the area security level is not associated with the voice control apparatus but is associated with information for specifying a location where the voice control apparatus is installed, even if the voice control apparatus is moved, an appropriate message can be notified without performing new settings.

OTHER EXAMPLES

In above-described second embodiment, as a method of associating an area with the device information, network connection status information (FIG. 19B) is obtained from the device management server 108, and an area in which a voice control apparatus is categorized is determined from the obtained network connection status information according to the classification conditions held in the cloud server 104. However, the cloud server 104 may have information of a relationship between the installation location and the area classification shown in FIG. 19D instead of the classification conditions in FIG. 19A, and the cloud server 104 may receive the location information of each voice control apparatus from the device management server 108 or the voice control apparatus and determine the area in which the device is to be categorized.

Alternatively, configuration may be taken such that when the device management server 108 manages the area classification and the cloud server 104 queries the device management server 108 about the area classification of a voice control apparatus, the device management server 108 returns area classification information for the voice control apparatus based on a data table that associates area classification and device information separately prepared by the device management server 108.

In addition, regarding a method of associating the area classification with the device information, a method of associating the area classification with the device information by using a position measurement technique such as GPS information, beacons, or an RFID of the device, in addition to registering device installation location information to the server or the device in advance can be considered. This is effective when the voice control apparatus is, for example, a smart phone.

Also, in the first and second embodiments described above, the FAX reception message notification sequence is described as a method of transmitting the message to the voice control apparatus, but the present invention is not limited thereto.

Also, as a method for determining the message security level, an example of analyzing attributes in an event message has been described, but in a case where natural language processing is performed on a notification message and a word with a high security risk is included in the voice audio output content, the message security level may be determined to be a high level.

Further, configuration may be taken such that the security level is changed in a case where a connection is made with an external device as a voice audio output device of the voice control apparatus. For example, in a case where a voice device that does not leak information to the outside (a headset or an earphone) is connected instead of a speaker, the device security level may be always be set to "1".

Also, in the above-described embodiments, configuration is such that confidential information having a security level higher than the security level of the device is not outputted as voice audio; however, for example, configuration may be taken such that a message masking the confidential information, for example, "Received a FAX from Mr. ***" is outputted to the voice control apparatus. Configuration may be taken such that in such a case the voice control apparatus changes the voice quality at the time of voice audio output of the masked content (female if the content is left unchanged, male if the content is masked). Alternatively, the volume of the masked portion may be lowered, a warning sound may be outputted, or the like.

Also, in the present embodiments, the first embodiment and the second embodiment have each been described independently, but the present invention may combine the first embodiment and the second embodiment. That is, the voice data to be transmitted to the device may be changed in consideration of the security level of the device (voice control apparatus) of the first embodiment and the security level of the set location of the device.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-24920, filed Feb. 21, 2022, Japanese Patent Application No. 2022-24921, filed Feb. 21, 2022, and Japanese Patent Application No. 2022-170871, filed Oct. 25, 2022, which are hereby incorporated by reference herein in their entirety.

What is claimed is:

1. An information processing system in which an image forming apparatus, an information processing apparatus, and voice control apparatuses can communicate via a network, the information processing system comprising:

the information processing apparatus comprising:

one or more first controllers including one or more first processors and one or more first memories, the one or more first controllers being configured to:

hold device security levels of the voice control apparatuses;

receive a notification indicating an occurrence of a predetermined event from the image forming apparatus, wherein the predetermined event includes one of a reception of an electronic message and a completion of output with image forming;

obtain, when the notification is received from the image forming apparatus, an event message associated with the predetermined event, wherein the event message includes a content of the predetermined event and a parameter;

obtain a parameter security level corresponding to the parameter;

obtain an event security level corresponding to the predetermined event;

generate a message for each security level equal to or lower than the obtained event security level, based on the content of the predetermined event and the obtained parameter security level;

determine which message to transmit to a target voice control apparatus based on a device security level of the target voice control apparatus and the security level of the message;

convert the message to be transmitted into voice data; and transmit the converted voice data to the target voice control apparatus, wherein, based on the received notification of the predetermined event, messages are transmitted to a plurality of target voice control apparatuses having device security levels different from each other, wherein the generating comprises generating messages including a message having information corresponding to both the predetermined event and the parameter, a message having information corresponding to the predetermined event excluding information corresponding to the parameter, and a message having generic information that does not correspond to either the predetermined event or the parameter, and wherein each target voice control apparatus comprises:

one or more second controllers including one or more second processors and one or more second memories, the one or more second controllers being configured to:

reproduce the voice data, which has been transmitted from the information processing apparatus.

2. The information processing system according to claim 1, wherein, in the obtaining of the parameter security level, the one or more first controllers refer to a storage.

3. The information processing system according to claim 1, wherein the one or more first controllers are further configured to set a device security level of each of the one or more voice control apparatuses.

4. The information processing system according to claim 1, wherein the device security level set for each target voice control apparatus is a security level corresponding to a location where the respective target voice control apparatus is positioned.

5. The information processing system according to claim 4, wherein the location where the target voice control apparatus is positioned is obtained based on position information obtained from each of the voice control apparatuses.

6. The information processing system according to claim 4, wherein the location where the target voice control apparatus is positioned is obtained based on a network that each of the voice control apparatuses is connected to.

7. An information processing apparatus that, in response to an occurrence of an event, causes any one of cooperating voice control apparatuses to output voice audio corresponding to the event, the information processing apparatus comprising:

one or more controllers including one or more processors and one or first memories, the one or more controllers being configured to:

hold device security levels of the voice control apparatuses;

receive a notification indicating an occurrence of a predetermined event from an image forming apparatus, wherein the predetermined event includes one of a reception of an electronic message and a completion of output with image forming;

obtain, when the notification is received from the image forming apparatus, an event message associated with the predetermined event, wherein the event message includes a content of the predetermined event and a parameter;

obtain a parameter security level corresponding to the parameter;

obtain an event security level corresponding to the predetermined event;

generate a message for each security level equal to or lower than the obtained event security level, based on the content of the predetermined event and the obtained parameter security level;

determine which message to transmit to a target voice control apparatus based on a device security level of the target voice control apparatus and the security level of the message;

convert the message to be transmitted into voice data; and transmit the converted voice data to the target voice control apparatus, wherein, based on the received notification of the predetermined event, messages are transmitted to a plurality of target voice control apparatuses having device security levels different from each other, and wherein the generating comprises generating messages including a message having information corresponding to both the predetermined event and the parameter, a message having information corresponding to the predetermined event excluding information corresponding to the parameter, and a message having generic information that does not correspond to either the predetermined event or the parameter.

8. The information processing apparatus according to claim 7, wherein, in the obtaining of the parameter security level, the one or more controllers refer to a storage that stores a security level corresponding to the parameter.

9. A method of controlling an information processing apparatus that, in response to an occurrence of an event, causes any one of a cooperating plurality of voice control apparatuses to output voice audio corresponding to the event, the control method comprising:

receiving a notification indicating an occurrence of a predetermined event from an image forming apparatus, wherein the predetermined event includes one of a reception of an electronic message and a completion of output with image forming;

obtaining, when the notification is received from an image forming apparatus, an event message associated with the predetermined event, wherein the event message includes a content of the predetermined event and a parameter;

obtaining a parameter security level corresponding to the parameter;

obtaining an event security level corresponding to the predetermined event;

generating a message for each security level equal to or lower than the obtained event security level, based on the content of the predetermined event and the obtained parameter security level;

determining which message to transmit to a target voice control apparatus based on a device security level of the target voice control apparatus and the security level of the message;

converting the message to be transmitted into voice data; and transmitting the converted voice data to the target voice control apparatus, wherein, based on the received notification of the predetermined event, messages are transmitted to a plurality of target voice control apparatuses having device security levels different from each other, and wherein the generating comprises generating messages including a message having information corresponding to both the predetermined event and the parameter, a message having information corresponding to the predetermined event excluding information corresponding to the parameter, and a message having generic information that does not correspond to either the predetermined event or the parameter.

10. A non-transitory computer-readable storage medium storing a program which, when executed by a processor, causes the processor to execute a method of controlling an information processing apparatus that, in response to an occurrence of an event, causes any one of a cooperating plurality of voice control apparatuses to output voice audio corresponding to the event, the method comprising:

receiving a notification indicating an occurrence of a predetermined event from an image forming apparatus, wherein the predetermined event includes one of a reception of an electronic message and a completion of output with image forming;

obtaining, when the notification is received from an image forming apparatus, an event message associated with the predetermined event, wherein the event message includes a content of the predetermined event and a parameter;

obtaining a parameter security level corresponding to the parameter;

obtaining an event security level corresponding to the predetermined event;

generating a message for each security level equal to or lower than the obtained event security level, based on the content of the predetermined event and the obtained parameter security level;

determining which message to transmit to a target voice control apparatus based on a device security level of the target voice control apparatus and the security level of the message;

converting the message to be transmitted into voice data; and transmitting the converted voice data to the target voice control apparatus, wherein, based on the received notification of the predetermined event, messages are transmitted to a plurality of target voice control apparatuses having device security levels different from each other, and wherein the generating comprises generating messages including a message having information corresponding to both the predetermined event and the parameter, a message having information corresponding to the predetermined event excluding information corresponding to the parameter, and a message having generic information that does not correspond to either the predetermined event or the parameter.

* * * * *